(12) United States Patent
Tanaka et al.

(10) Patent No.: US 7,188,311 B2
(45) Date of Patent: Mar. 6, 2007

(54) DOCUMENT PROCESSING METHOD AND APPARATUS, AND PRINT CONTROL METHOD AND APPARATUS

(75) Inventors: Satoshi Tanaka, Kanagawa (JP); Kenichi Kazumi, Kanagawa (JP); Shigeo Nara, Kanagawa (JP); Yasuo Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 801 days.

(21) Appl. No.: 10/241,633

(22) Filed: Sep. 12, 2002

(65) Prior Publication Data

US 2003/0056176 A1 Mar. 20, 2003

(30) Foreign Application Priority Data

| Sep. 14, 2001 | (JP) | 2001-280391 |
| Sep. 14, 2001 | (JP) | 2001-280393 |
| Jul. 30, 2002 | (JP) | 2002-222020 |

(51) Int. Cl.
*G06F 15/00* (2006.01)

(52) U.S. Cl. .............. 715/522; 358/1.15; 358/1.12; 358/1.13; 715/527; 345/764

(58) Field of Classification Search ............ 358/1.12, 358/1.15, 1.14, 1.13; 345/764; 399/82; 707/523; 715/522, 527
See application file for complete search history.

(56) References Cited

U.S. PATENT DOCUMENTS 6,462,756 B1 * 10/2002 Hansen et al. ............ 715/764
6,509,974 B1 * 1/2003 Hansen ..................... 358/1.12
6,512,899 B2 * 1/2003 Shimada et al. .............. 399/82
6,825,943 B1 * 11/2004 Barry et al. ............... 358/1.15

FOREIGN PATENT DOCUMENTS

| JP | 6-28351 | 2/1994 |
| JP | 7-302262 | 11/1995 |
| JP | 8-249319 | 9/1996 |

* cited by examiner

*Primary Examiner*—Kimberly Williams
*Assistant Examiner*—Scott Schlack
(74) *Attorney, Agent, or Firm*—Fitzpatrick, Cella, Harper & Scinto

(57) ABSTRACT

Attributes can be set for an entire document, each chapter, and each page by using an entire document attribute, chapter attribute, and page attribute. When the print format of a chapter is set with a chapter attribute different from the entire document attribute, this chapter is printed in a print format complying with the chapter attribute. Similarly, when the print format of a page is set with a page attribute different from the entire document attribute or chapter attribute, this page is printed in the print format complying with the page attribute. In hierarchically displaying the document structure with a book, chapters, and pages, a predetermined icon is so added as to identify a chapter or page having a unique attribute.

9 Claims, 28 Drawing Sheets

FIG. 4A

| NO | ATTRIBUTE INFORMATION | | REMARKS |
|---|---|---|---|
| 1 | PRINTING METHOD | SINGLE-SIDED / DOUBLE-SIDED / BOOKBINDING PRINTING | |
| 2 | PAPER SIZE | ORIGINAL SIZE / FIXED SIZE | • Z-FOLD IS DESIGNATED WHEN "A4 + A3", "B4 + B3", OR "LETTER + LEDGER (11 × 17)" IS DESIGNATED<br>• ORIGINAL SIZE OF FIRST CHAPTER / PAGE IS AUTOMATICALLY SELECTED WHEN BOOKBINDING PRINTING OR N-up PRINTING IS DESIGNATED |
| 3 | PAPER DIRECTION | PORTRAIT / LANDSCAPE | • SELECTABLE ONLY FOR FIXED SIZE |
| 4 | BINDING MARGIN / BINDING DIRECTION | | • SHIFT / ENLARGEMENT & REDUCTION CAN BE DESIGNATED |
| 5 | N-up PRINTING | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 6 | ENLARGEMENT / REDUCTION | ON / OFF | ON IS AUTOMATICALLY DESIGNATED WHEN PAPER SIZE IS FIXED SIZE OR N-up PRINTING IS SELECTED. CAN BE SET TO OFF |
| 7 | WATERMARK | | • WATERMARK CAN BE DESIGNATED INDIVIDUALLY IN LOGICAL OR PHYSICAL PAGES<br>• ALL CHAPTERS / PAGES ARE TARGETED |

FIG. 4B

| | | | |
|---|---|---|---|
| 8 | HEADER/FOOTER | | • HEADER/FOOTER CAN BE DESIGNATED INDIVIDUALLY IN LOGICAL OR PHYSICAL PAGES<br>• ALL CHAPTERS/PAGES ARE TARGETED |
| 9 | DISCHARGE METHOD | STAPLE/PUNCH HOLE | • STAPLING/PUNCHING ONLY IN SINGLE-/DOUBLE-SIDED PRINTING<br>• STAPLING AT ONE/TWO POSITIONS |
| 10 | DETAILS OF BOOKBINDING | OPENING DIRECTION/SADDLE STITCH/ENLARGEMENT & REDUCTION DESIGNATION/BINDING MARGIN/ FASCICLE DESIGNATION, etc. | • ONLY IN BOOKBINDING PRINTING |
| 11 | FRONT/BACK COVER | | • PRINTING IS DESIGNATED FOR 1/2 FRONT COVER OR 1/2 BACK COVER<br>• FEED PORT (INCLUDING INSERTER) IS DESIGNATED |
| 12 | INDEX SHEET | | • PRINTING OF CHARACTER STRING ON INDEX PORTION OR ANNOTATION ON INDEX SHEET CAN BE SET<br>• BOOKBINDING CANNOT BE DESIGNATED |
| 13 | SLIP SHEET | | • FEED PORT (INCLUDING INSERTER) IS DESIGNATED<br>• ORIGINAL DATA CAN BE PRINTED ON INSERTED PAPER<br>• BOOKBINDING CANNOT BE DESIGNATED |
| 14 | CHAPTERING | "NONE"/"PAGE BREAK"/ "PAPER CHANGE" | • "PAPER CHANGE" IS FIXED WHEN INDEX SHEET OR SLIP SHEET IS DESIGNATED<br>• "PAPER CHANGE" IN SINGLE-SIDED PRINTING |

FIG. 5

| NO | ATTRIBUTE INFORMATION | | REMARKS |
|----|----|----|----|
| 1 | PAPER SIZE | ORIGINAL SIZE / FIXED SIZE | • "PAPER CHANGE" IS AUTOMATICALLY DESIGNATED WHEN FIXED SIZE IS SELECTED<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK |
| 2 | PAPER DIRECTION | PORTRAIT / LANDSCAPE | • SELECTABLE ONLY FOR FIXED SIZE |
| 3 | N-up PRINTING | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 4 | ENLARGEMENT / REDUCTION | ON / OFF | • ON IS AUTOMATICALLY DESIGNATED WHEN PAPER SIZE IS FIXED SIZE OR N-up PRINTING IS SELECTED. CAN BE SET TO OFF |
| 5 | WATERMARK | DISPLAY / NON-DISPLAY | • WHETHER TO DISPLAY ALL WATERMARKS DESIGNATED BY BOOK IS DESIGNATED |
| 6 | HEADER / FOOTER | DISPLAY / NON-DISPLAY | • WHETHER TO DISPLAY ALL HEADERS / FOOTERS DESIGNATED BY BOOK IS DESIGNATED |
| 7 | DISCHARGE METHOD | STAPLE | • STAPLE CAN BE SET OFF WHEN STAPLE IS DESIGNATED BY BOOK. DEFAULT VALUE IS "ON" |

FIG. 6

| NO | ATTRIBUTE INFORMATION | | REMARKS |
|---|---|---|---|
| 1 | PAGE ROTATION DESIGNATION | | • 0°/90°/180°/270° CAN BE DESIGNATED |
| 2 | WATERMARK | DISPLAY / NON-DISPLAY | • WHETHER TO DISPLAY ALL WATERMARKS DESIGNATED BY BOOK IS DESIGNATED |
| 3 | HEADER / FOOTER | DISPLAY / NON-DISPLAY | • WHETHER TO DISPLAY ALL HEADERS/FOOTERS DESIGNATED BY BOOK IS DESIGNATED |
| 4 | ZOOM | 50% - 200% | • ZOOM RATIO RELATIVE TO SIZE WHICH IS FIT IN VIRTUAL LOGICAL PAGE REGION AND SET AS 100% IS DESIGNATED |
| 5 | LAYOUT POSITION | | • NINE FIXED PATTERNS AND ARBITRARY POSITION CAN BE DESIGNATED |
| 6 | ANNOTATION | | |
| 7 | VARIABLE ITEM | | |
| 8 | PAGE DIVISION | | |

FIG. 10

```
┌─────────────────────────────────────────────────┐
│ Detailed Settings of Chapter              [?][X]│
├─────────────────────────────────────────────────┤
│ │Page Settings│ Finishing │ Edit │ Paper Feed │ │
```

801 — ☐ Make Settings on Output Paper Coincide with Book

Output Paper Size :   [ Same as Original Size ▼ ]

☑ Enlarge / Reduce Original in Accordance with Output Paper Size

Print Orientation :   [A] ⊙ Portrait   [A] ○ Landscape

802 — ☐ Make Settings on Page Layout Coincide with Book

Page Layout (L) :   [ 2 Pages / Sheet ▼ ]

Layout Order :   [ → From Left To Right ▼ ]

Boundary :   [ None ▼ ]

803 — ☐ Make Settings on Original Layout Coincide with Book

☑ Enlarge / Reduce Original in Accordance with Print Region

Arrange Original :   [ Center ▼ ]

[ Restore Defaults ]

[ OK ] [ Cancel ] [ Apply (A) ] [ Help ]

FIG. 17

1700 — `<Media CANOJT:CPCAMediaType="stationery" Dimension="595 842" SignatureName="Signature 1" />`  
1701 — `<Media CANOJT:CPCAMediaType="stationery" Dimension="595 842" SignatureName="Signature 2" />`   ⎬ 1710
1702 — `<Media CANOJT:CPCAMediaType="stationery" Dimension="842 1191" SignatureName="Signature 3" />`

1703 — `<Signature Name="Signature1">`
       `······`
       `</Signature>`

1704 — `<Signature Name="Signature2">`
       `······`
       `</Signature>`

1705 — `<Signature Name="Signature3">`
       `······`
       `</Signature>`

⎬ 1711

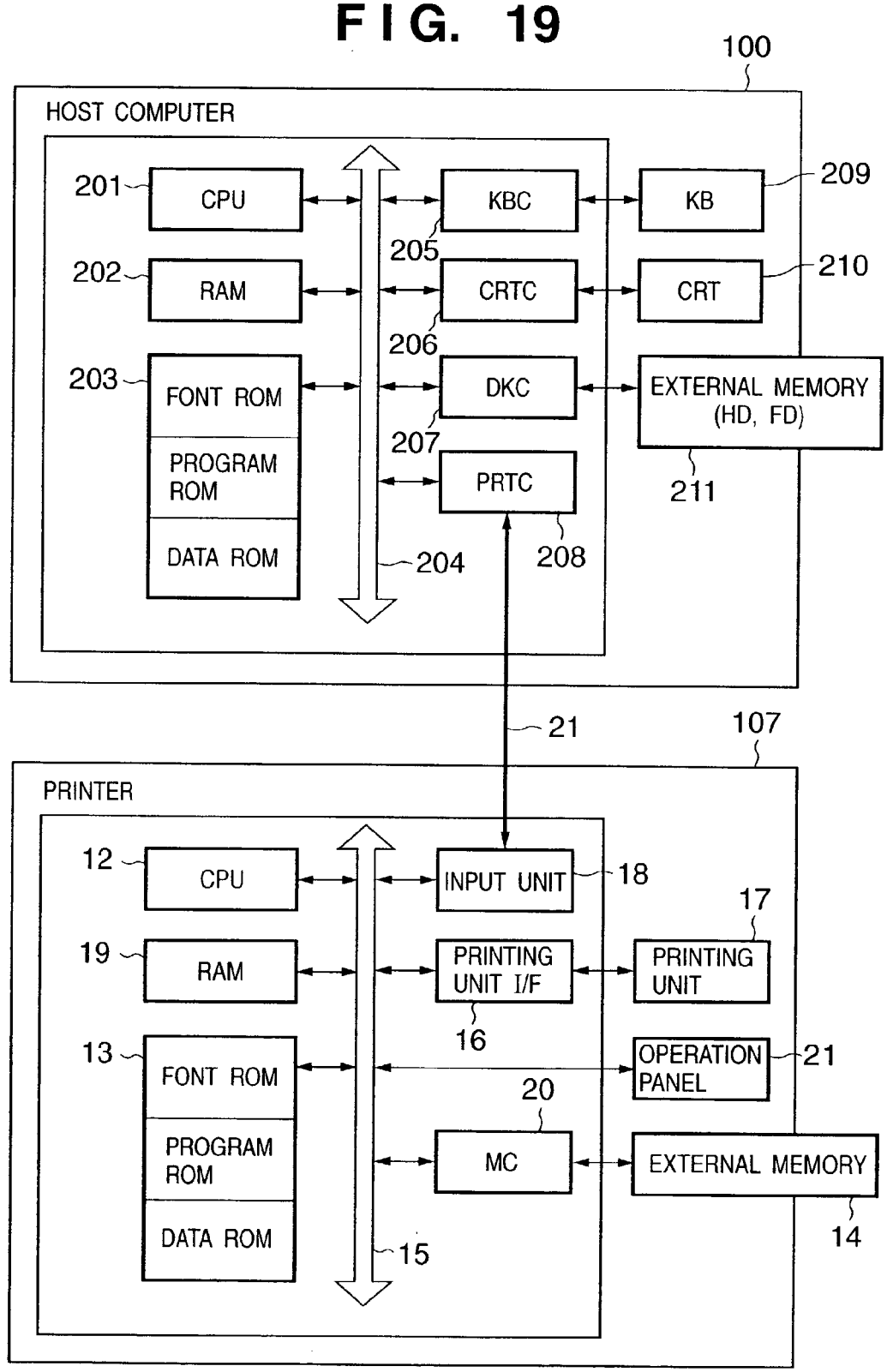

COMMON SETTING THROUGHOUT Book

UNIQUE SETTING IN ARBITRARY CHAPTER

UNIQUE SETTING IN ARBITRARY PAGE

DOCUMENT PROCESSING METHOD AND APPARATUS, AND PRINT CONTROL METHOD AND APPARATUS

FIELD OF THE INVENTION

The present invention relates to a document processing method and apparatus and a print control method and apparatus capable of individually setting chapters and pages of a document which includes chapters and pages.

BACKGROUND OF THE INVENTION

Different types of data such as characters, tables, and images require different structures which define the data and different editing operations for the data. Various application programs are provided in accordance with the type of data. The user uses different applications for different types of data: a character processing program in order to edit characters, a spreadsheet program in order to edit tables, and an image editing program in order to edit images.

In this way, the user generally uses different application programs for different types of data. In general, a document to be created by the user is made up of a plurality of types of data such as characters and tables, or characters and images, rather than a document formed from only one type of data such as characters, tables, or images. To create a document containing a plurality of types of data, the user must use the printing functions of various applications to print data corresponding to the respective applications, read the printed materials by a scanner or the like, and combine them in a desired order.

Some programs such as so-called "Office Suite" which forms one integrated application from various applications provide a function of combining data generated by respective applications into one document. The use of the integrated application allows the user to combine data created by respective applications into one target document by using a specific application included in the integrated application.

When a print instruction for a document created in this way is issued from an information processing apparatus such as a personal computer, various print formats can be set for the document, and the user can print it with a high degree of freedom. For a document to be printed which includes chapters and pages, an exceptional print format different from the print format of the document can be set for the chapters or pages, realizing print format setting with a higher degree of freedom.

However, to assign page numbers to pages when the user creates one target document by combining print materials generated by various applications, he/she must print out all necessary data, combine them into a document, and determine page numbers. Each application must write determined page numbers on respective pages (to be referred to as logical pages or original pages) of an original created by the application.

Even if the application program has a function of assigning page numbers, the page numbers of discontinuous pages must be designated by the user. If the pages of the document are rearranged, page numbers must be reassigned in accordance with the rearrangement. Data must also be edited and printed again by an application when not data contents but merely the print format is changed such that a plurality of original pages are combined into one page (to be referred to as a physical page or print page) as a print material, or single-sided printing is changed to double-sided printing.

Since an application which can manage data forming one document changes depending on the type of data, the user must manually interface between applications in processing the document. This means that much labor is demanded of the user, decreasing the productivity. The many manual operations readily generate errors.

The use of an integrated application for creating a document enables arranging various data in the data state without printing them out. No heavy labor is required from the user in comparison with creation of a target document by combining printed materials. However, applications for editing and creating various data are restricted to ones included in the integrated application, so a user-desired application may not be exploited.

A document created by the integrated application is one document file, and management such as editing and output of the document is done for each document file. The application function poses many constraints on setting the format of part of the document file. For example, the user must change format settings at each portion where the format is changed, and print a target page again. This leads to much labor and low productivity, similar to the above-mentioned method.

In the conventional exceptional print format setting method, the print format can be exceptionally designated for each chapter or page. According to this conventional method, however, minor exceptional setting (zoom of each page, designation of the angle, designation of the layout position of each chapter, or the like) requires setting all attributes including the exceptional setting again. If the settings of the entire document accidentally coincide with settings exceptionally set for each chapter or page, it is difficult to determine whether to make the settings of each chapter or page coincide with those of the entire document or to leave the settings of each chapter or page as exceptional settings. In addition, settings are not unique to each chapter or page when the settings of the chapter or page are made to coincide with those of the entire document.

To display a document structure on a document information processing apparatus such as a personal computer, tree view display which hierarchically displays the document structure is generally adopted. For example, when a document is made up of chapters and pages, a plurality of chapters included in the document are displayed immediately below the document, and pages included in each chapter are hierarchically displayed immediately below the chapter. The document, chapters, and pages are displayed by different icons, providing an easy-to-see hierarchical structure. When a document is formed from a plurality of captions and their descriptions, these captions are grouped and hierarchically expressed.

The conventional tree view display employs a method of sectioning documents in document, chapter, and page units, and associating information between the respective units. This tree view display does not consider an expression method when related information is cut between documents, chapters, or pages. The related information in these units includes print information, page layout information, and header/footer information. For example, when print information, page layout, header/footer information, and the like are commonly applied to the entire document, the document can be expressed by tree view display without cutting the pieces of related information in the above units. However, when print information, page layout information, header/footer information, and the like cannot be commonly applied to documents, chapters, and pages, the pieces of information cannot be associated with each other between the units. This poses a problem in the conventional tree view display method.

SUMMARY OF THE INVENTION

The present invention has been made to overcome the conventional drawbacks, and has as its object to provide a document processing method and apparatus and a print control method and apparatus which increase the document creation/editing operability and document editing productivity.

It is another object of the present invention to provide a document processing method and apparatus and a print control method and apparatus capable of easily setting an arbitrary print format in a predetermined document unit in setting the print format of a document.

It is still another object of the present invention to provide a document processing system and method which enable creating and editing a document made up of data created by user-desired application programs, and increase the operability and document editing productivity.

It is still another object of the present invention to provide a document processing apparatus and method which realize different settings for information units which constitute a document, e.g., an entire document, chapters, and pages, and can display contents set for these information units together with the document structure in an easy-to-see manner.

In order to attain the above described objects, a document processing method of the present invention is as follows:

a document processing method of setting a print format of a document, comprises a first setting step of setting a print format of the entire document; a second setting step of setting a print format of each predetermined attribute unit included in the document for each predetermined unit of the document; and a conversion step of adjusting the print format of the document on the basis of the print formats set at the first and second setting steps, wherein in the conversion step, the print format of the predetermined attribute unit set in the second setting step has priority as a print format for the predetermined unit of the document over the print format set at the first setting step.

In order to attain the above described objects, a document processing apparatus of the present invention is as follows:

A document processing apparatus which sets a print format of a document, comprises first setting means for setting a print format of the entire document; second setting means for setting a print format of each predetermined attribute unit included in the document for each predetermined unit of the document; and conversion means for adjusting the print format of the document on the basis of settings by the first and second setting means, wherein the conversion means gives priority to the print format of the predetermined attribute unit set by the second setting means as a print format for the predetermined unit of the document over the print format set by the first setting means.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIGS. 3A and 3B depict views showing an example of a book file structure according to the embodiment, in which FIG. 3A depicts a view schematically showing an example of a book file format, and FIG. 3B is a view showing an original data structure;

FIGS. 4A and 4B depict tables showing examples of a book attribute according to the embodiment;

FIG. 5 depicts a table showing an example of a chapter attribute according to the embodiment;

FIG. 6 depicts a table showing an example of a page attribute according to the embodiment;

FIG. 10 depicts a view showing an example of a user interface for performing detailed settings of a chapter according to the embodiment of the present invention;

FIG. 17 depicts a view for explaining an example of a job ticket according to the embodiment;

FIG. 19 is a block diagram for explaining the arrangements of a host computer and printer in the document processing system according to the embodiment of the present invention;

DETAILED DESCRIPTION OF THE PREFERRED EMBODIMENTS

Preferred embodiments of the present invention will be described in detail below with reference to the accompanying drawings.

<General Description of System>

A document processing system according to an embodiment of the present invention will be described. This document processing system converts a data file created by a general application into an electronic original file by an electronic original writer. A bookbinding application provides a function of editing the electronic original file. Details of the system will be explained below.

<System Configuration and Operation>

Figure 1:
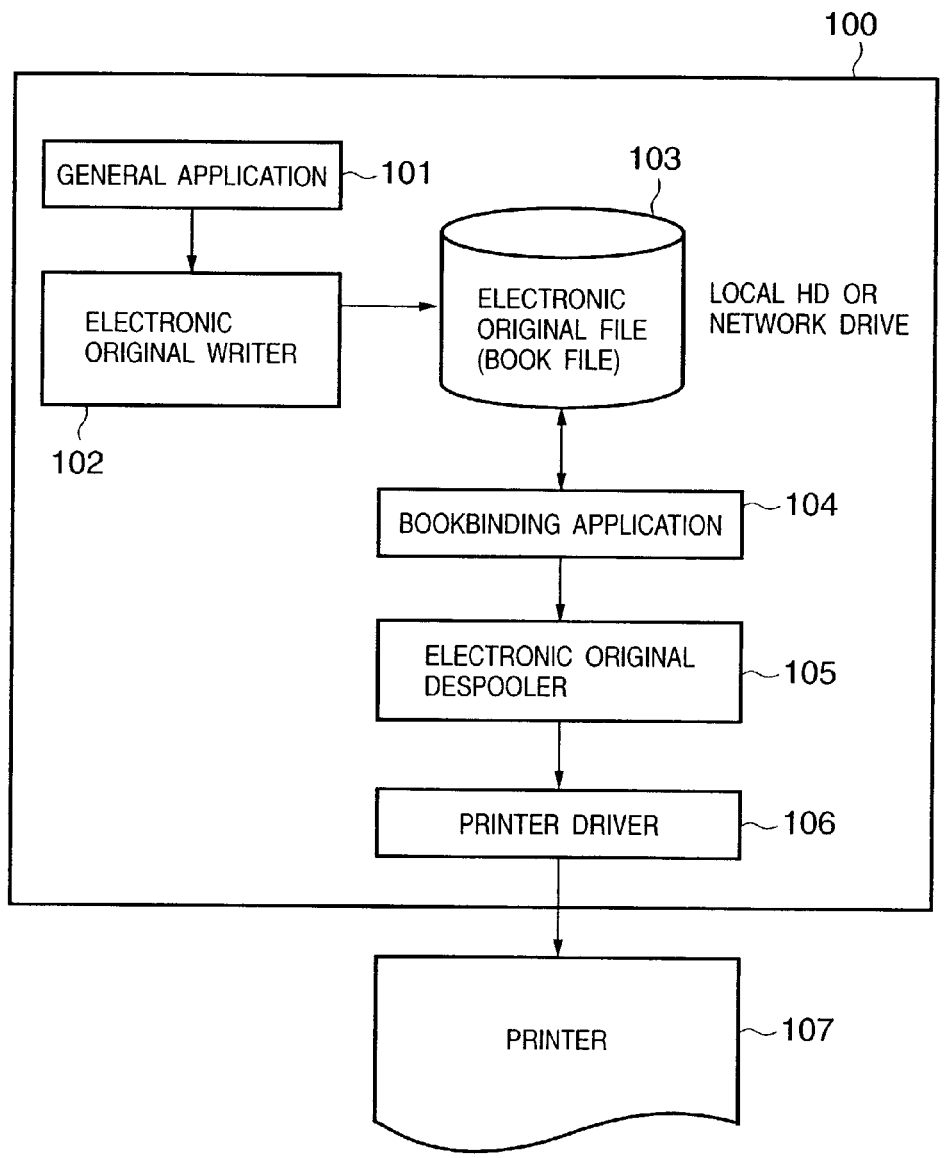
FIG. 1 is a block diagram for explaining the arrangement of a stand-alone document processing system according to an embodiment of the present invention.

FIG. 1 is a block diagram showing the software structure of the document processing system according to the embodiment of the present invention.

In FIG. 1, the document processing system is implemented by a digital computer 100. A general application 101 is an application program which provides functions such as words-processing, spreadsheet, photo-retouch, draw, paint, presentation, and text editing. The general application 101 has a printing function. The application 101 utilizes a predetermined interface provided by the OS (Operating System) in printing data such as created document data or image data. To print created data, the application 101 transmits, to the output module of the OS providing the predetermined interface, an output command which is determined in advance and has an OS-dependent format. The output module which has received the output command converts the command into a format processible by an output device such as a printer, and outputs the converted command. Since the format processible by the output device changes depending on the type of device, the manufacturer, and the model, a device driver is provided for each device. The OS converts a command by using the device driver. When the OS is, for example, Microsoft Windows®, the output module is a GDI (Graphic Device Interface) module.

An electronic original writer 102 is one of the above-mentioned device drivers, and is a software module provided to implement the document processing system according to this embodiment. The electronic original writer 102 does not target a specific output device, and converts an output command into a format processible by a bookbinding application 104 or printer driver 106 (to be described later). The format (to be referred to as an "electronic original format" hereinafter) converted by the electronic original writer 102 is not particularly limited as far as each original page can be expressed by a detailed format. Of substantial standard formats, for example, the PDF format by Adobe Systems and the SGML format can be adopted as electronic original formats. When the application 101 utilizes the electronic original writer 102, the electronic original writer 102 is designated as a device driver used for output, and then caused to execute printing. An electronic original file created by the electronic original writer 102 does not have a complete electronic original file format. For this reason, the electronic original writer 102 is designated as a device driver by the bookbinding application 104, and executes conversion of application data into an electronic original file 103 under the management of the bookbinding application 104.

The bookbinding application 104 completes a new incomplete electronic original file generated by the electronic original writer 102 as the electronic original file 103 having the following format. In case of necessity to definitely discriminate these files, a file created by the electronic original writer 102 will be called an electronic original file, and an electronic original file given a structure by the bookbinding application 104 will be called a book file.

As described above, the electronic original writer 102 is designated as a device driver, and the general application 101 prints the data. Application data is converted into data of an electronic original format in pages (to be referred to as "logical pages" or "original pages" hereinafter) defined by the application 101. The converted data is stored as the electronic original file 103 in a storage medium such as a hard disk. The hard disk may be the local drive of the computer 100 which implements the document processing system of this embodiment, or when the computer is connected to a network, may be a drive provided on the network.

The bookbinding application 104 provides the user with a function of loading and editing the electronic original file or book file 103. The bookbinding application 104 provides no function of editing the contents of each page, but a function of editing a chapter or book structure (to be described later) made up of pages as a minimum unit.

To print the book file 103 edited by the bookbinding application 104, the bookbinding application 104 activates an electronic original despooler 105. The electronic original despooler 105 reads out a designated book file from the hard disk. To print each page in a format described in the book file, the electronic original despooler 105 generates an output command complying with the output module of the OS described above, and outputs the command to the output module (not shown). At this time, the printer driver 106 for a printer 107 used as an output device is designated as a device driver. The output module converts the output command received using the designated printer driver 106 of the printer 107 into a device command interpretable by the printer 107. The device command is transmitted to the printer 107, which prints an image corresponding to the command.

Figure 2:
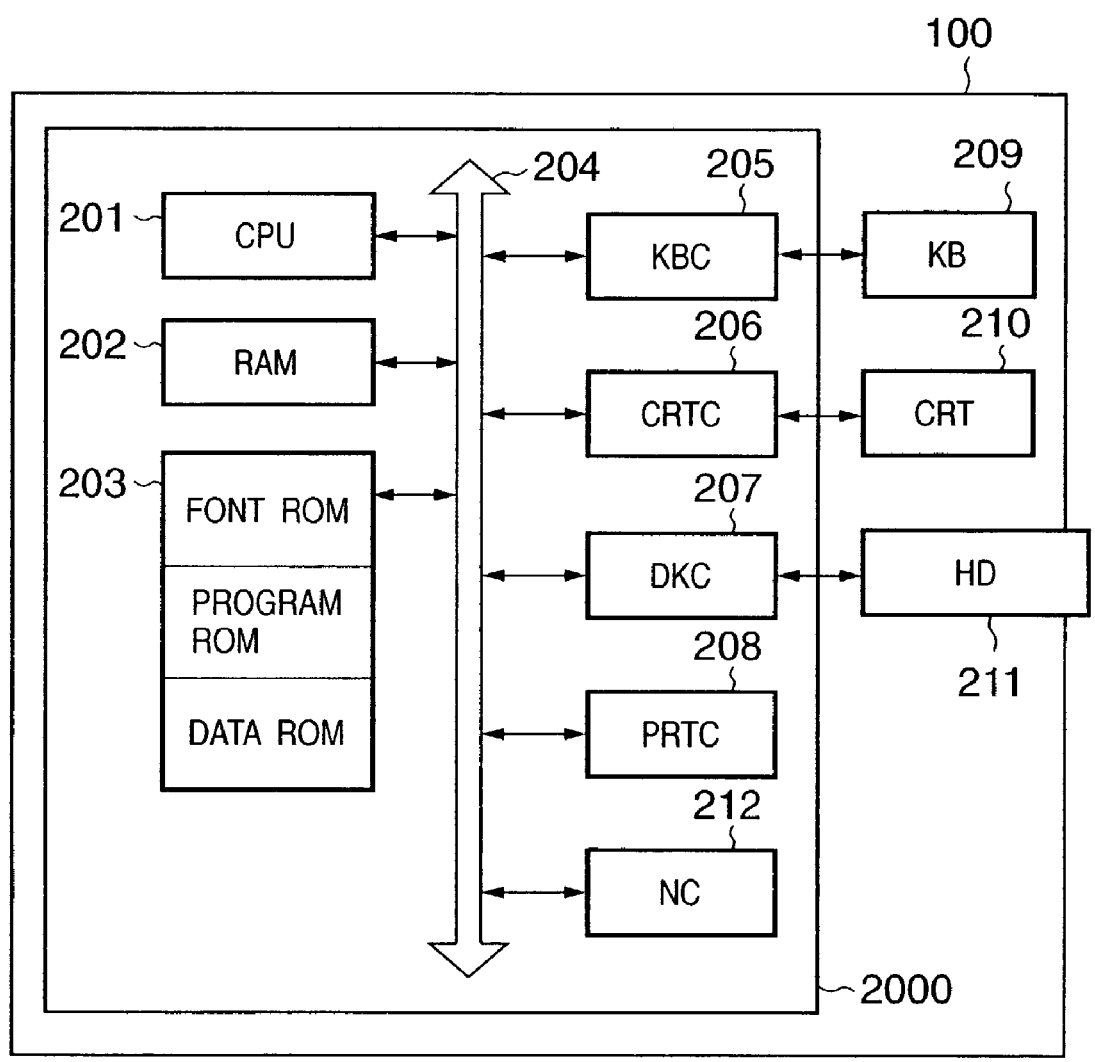
FIG. 2 is a block diagram showing the arrangement of a host computer which implements the document processing system according to the embodiment.

FIG. 2 is a block diagram showing the hardware arrangement of the computer 100 according to this embodiment.

In FIG. 2, a CPU 201 executes a program such as an OS, general application 101, or bookbinding application 104 which is stored in the program ROM of a ROM 203 or loaded from a hard disk 211 to a RAM 202, and realizes the software structure in FIG. 1 or flow chart procedures (to be described later). The CPU 201 intensively controls devices connected to a system bus 204. The font ROM of the ROM 203 or the hard disk 211 stores font data or the like used to execute the bookbinding application 104. The RAM 202 functions as the main memory or work area of the CPU 201. A keyboard controller (KBC) 205 controls an information input from a keyboard 209 or a pointing device (not shown). A CRT controller (CRTC) 206 controls the display on a CRT display 210. A disk controller (DKC) 207 controls access to the hard disk (HD) 211 or floppy disk (FD) (not shown) which stores a boot program, various applications, font data, user files, editing files (to be described later), a printer control command generation program (to be referred to as a printer driver hereinafter), and the like. A printer controller (PRTC) 208 controls signal exchange with the connected printer 107 (see FIG. 1). A network controller (NC) 212 is connected to a network, and executes communication control processing with another device connected to the network.

The CPU 201 executes, e.g., rasterizing processing of an outline font to a display information RAM set in the RAM 202, realizing WYSIWYG on the CRT 210. The CPU 201 opens various registered windows on the basis of commands designated by a mouse cursor (not shown) or the like on the CRT 210, and executes various data processes. In executing printing, the user opens a window concerning print settings, and can perform setting of a print processing method to a printer driver including setting of a printer and selection of a print mode.

<Electronic Original Data Format>

Before the bookbinding application 104 is described in detail, the book file data format will be explained.

The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may include a plurality of chapters, and one chapter may include a plurality of pages.

Figure 3A:
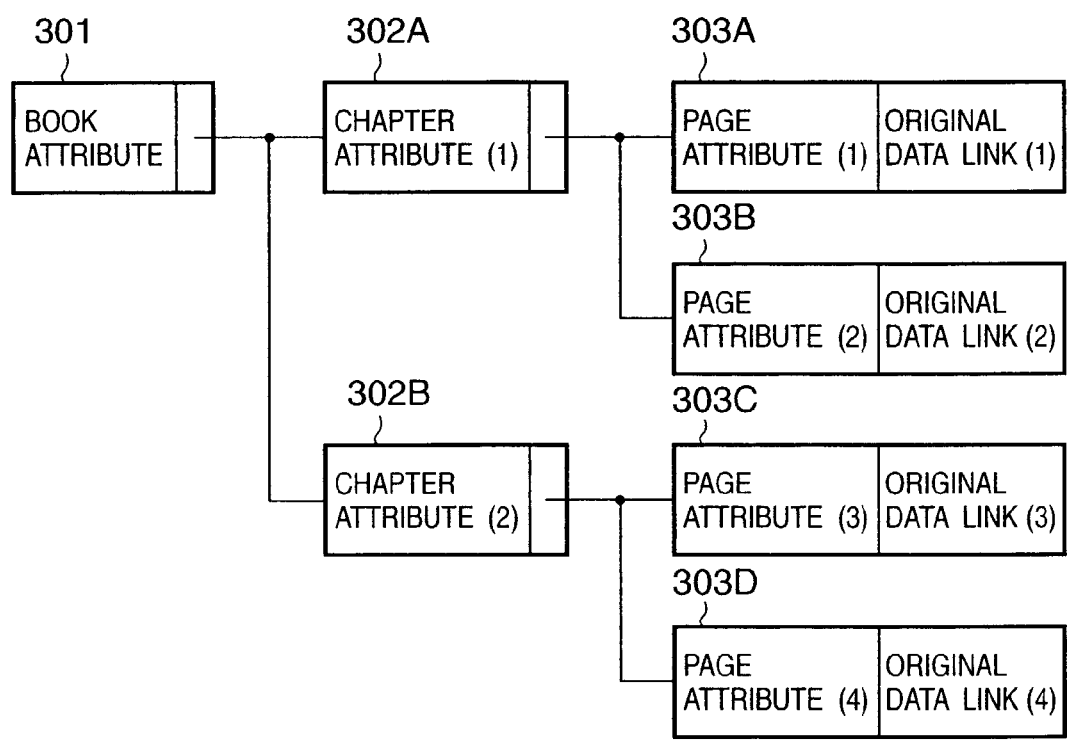
Figure 3B:
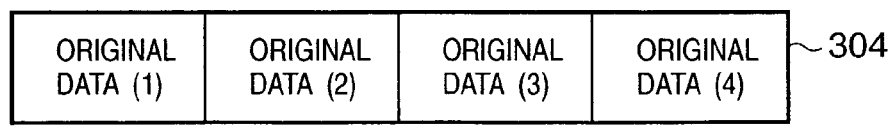

FIGS. 3A and 3B depict views schematically showing an example of the book file format. In the book file of this example, a book, chapter, and page are represented by corresponding nodes. One book file includes one book. The book and chapter are a concept for defining a book structure, and contain defined attribute values and links to lower layers. The page has, as an entity, data of each page output from an application program. In addition to an attribute value, the page contains the entity of an original page (original data) and a link to each original data. In some cases, a print page to be output onto a paper medium or the like includes a plurality of original pages. This structure is displayed not by a link but by an attribute in the book, chapter, or page layer.

In FIG. 3A, a book 301 defines a book attribute, and is linked to chapter attributes 302A and 302B representing two chapters. These links display that the two chapters corresponding to the chapter attributes 302A and 302B are included in the book defined by the book attribute 301. The chapter attribute 302A is linked to page attributes 303A and 303B, which represents that the chapter includes pages corresponding to these page attributes. The page attributes 303A and 303B define attribute values, and contain links to original data (1) and (2) serving as entities. These links represent data (1) and (2) of original data 304 shown in FIG. 3B, and display that the entities of the page attributes 303A and 303B are original data (1) and (2). Similarly, the chapter attribute 302B is linked to page attributes 303C and 303D, and original data corresponding to these page attributes are original data (3) and (4) shown in FIG. 3B.

FIGS. 4A and 4B depict tables for explaining examples of the book attribute 301. As for an attribute item which can be defined repetitively on a lower layer out of attribute items, the attribute value of the lower layer is preferentially adopted. As for an item contained in only the book attribute, a value defined in the book attribute is effective over the book. An item repetitively defined on a lower layer is a default value used when this item is not defined in the lower layer. Each attribute item shown in FIGS. 4A and 4B does not always correspond to one concrete item, but may contain a plurality of relevant items.

FIG. 5 depicts a table for explaining an example of the chapter attribute, and FIG. 6 depicts a table for explaining an example of the page attribute. The relationship between the chapter attribute and the page attribute is the same as that between the book attribute and the lower layer attribute.

As is apparent from FIGS. 4A to 6, items unique to the book attribute 301 are six items "printing method", "details of bookbinding", "front/back cover", "index sheet", "slip sheet", and "chaptering". These attribute items are defined over the book. As "printing method" attributes, three values "single-sided printing", "double-sided printing", and "bookbinding printing" can be designated. "Bookbinding printing" is a method of printing data in a format which allows bookbinding by bundling a separately designated number of paper sheets, folding the bundle into two, and binding the bundle. As "details of bookbinding", the opening direction and the number of paper sheets to be bundled can be designated when "bookbinding printing" is designated.

"Front/back cover" includes designation of adding paper sheets serving as front and back covers when an electronic original file combined as a book is printed, and designation of contents to be printed on the added paper sheets. "Index sheet" includes designation of inserting a tabbed index sheet separately prepared in a printing apparatus for chaptering, and designation of contents to be printed on the index (tabbed) sheet. This attribute becomes effective when a printing apparatus to be used is equipped with an inserter having an inserting function of inserting a paper sheet prepared separately from a print paper sheet into a desired position, or when a plurality of sheet cassettes can be used. This also applies to "slip sheet". "Slip sheet" includes designation of inserting a paper sheet fed from an inserter or sheet feed cassette for chaptering, and designation of a sheet feed source when a slip sheet is inserted.

"Chaptering" includes designation of whether to use a new paper sheet, use a new print page, or do nothing particular at a chapter break. In single-sided printing, the use of a new paper sheet and the use of a new print page are the same. In double-sided printing, successive pages are not printed on one paper sheet if "the use of a new paper sheet" is designated, but may be printed on the upper and lower surfaces of one paper sheet if "the use of a new print page" is designated.

As for the chapter attribute in FIG. 5, there is no item unique to the chapter, and all items overlap those of the book attribute. If the definition of the chapter attribute is different from that of the book attribute, a value defined by the chapter attribute precedes. Attribute items common to only the book and chapter attributes are five items "paper size", "paper direction", "N-up printing designation", "enlargement/reduction", and "discharge method". The "N-up printing designation" attribute is an item for designating the number of original pages included in one print page. Layouts which can be designated are 1×1, 1×2, 2×2, 3×3, 4×4, and the like. "Discharge method" is an item for designating whether to staple discharged paper sheets. The effectiveness of this attribute depends on whether a printer to be used has a staple function.

Items unique to the page attribute shown in FIG. 6 are "page rotation", "zoom", "layout position", "annotation", and "page division". "Page rotation" is an item for designating the rotation angle when an original page is laid out on a print page. "Zoom" is an item for designating the zoom ratio of an original page. The zoom ratio in zoom is designated based on a virtual logical page region size=100%. The virtual logical page region is a region occupied by one original page when original pages are laid out in accordance with N-up designation or the like. For example, the virtual logical page region is a region corresponding to one print page for 1×1, and a region obtained by reducing each side of one print page to about 70% for 1×2.

Attribute items common to the book, chapter, and page attributes are "watermark" and "header/footer". "Watermark" is a separately designated image or character string printed over data created by an application. "Header and footer" are watermarks printed at the upper and lower margins of each page. For "header and footer", items such as a page number, and time and date which can be designated by variables are prepared. Contents which can be designated by "watermark" and "header/footer" are common to the chapter and page attributes, but are different in the book attribute. The book attribute can set the contents of the watermark and header/footer, and designate how to print a watermark or header/footer throughout the book. To the contrary, the chapter and page attributes can designate whether to print a watermark or header/footer set in the book attribute on the chapter or page.

A method of exceptionally designating print format setting in the document processing system according to this embodiment will be described.

Figure 7:
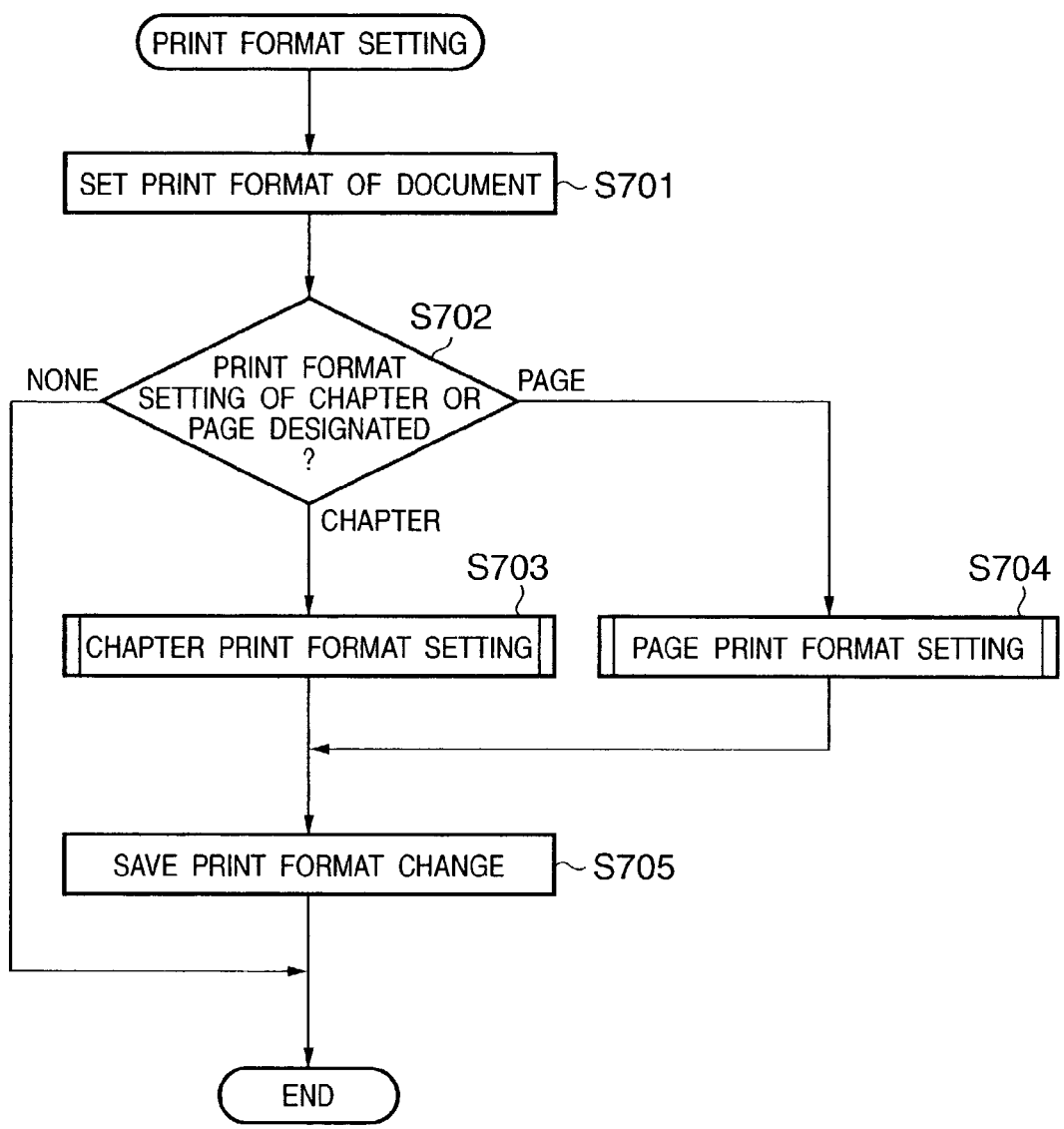
FIG. 7 is a flow chart showing the overall processing flow of print format setting in the document processing system according to the embodiment of the present invention.

FIG. 7 is a flow chart showing the overall processing flow of print format setting in the document processing system according to this embodiment. Before exceptional designation in this embodiment, the print format of an entire book is set in an operation window shown in FIG. 8 in step S701.

Figure 8:
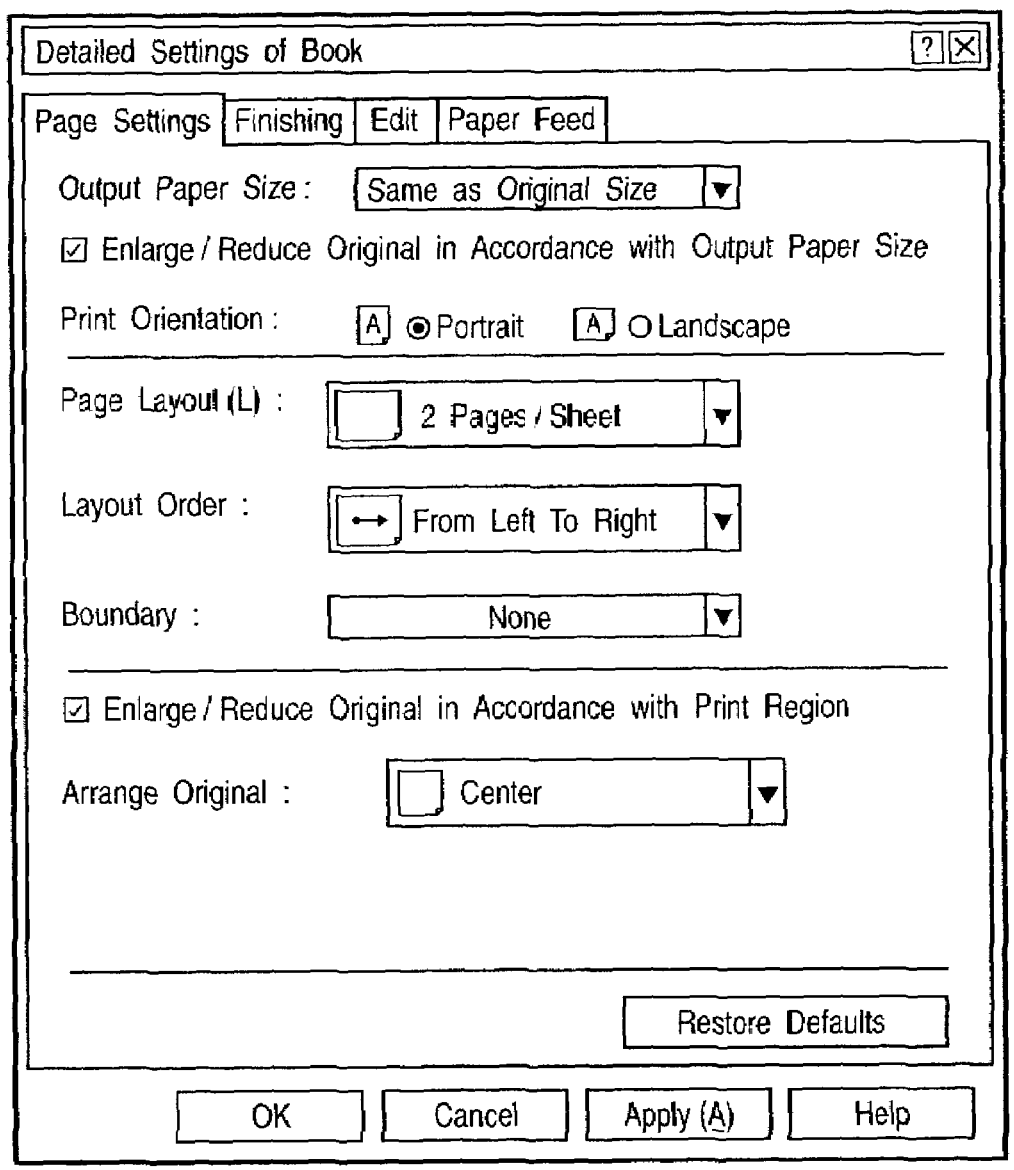
FIG. 8 depicts a view showing an example of a user interface for performing detailed settings of a book according to the embodiment of the present invention.

FIG. 8 is a view showing the "detailed settings of book" window of the bookbinding application 104. This window is activated from "detailed settings of book" (not shown) of the editing menu on the application operation window in FIG. 9, or the "detailed settings of book" button (not shown) on the tool bar, and is displayed on the CRT 210. The "detailed settings of book" window is used to set attributes which influence the entire book. As shown in FIG. 8, this window is constituted by four sheets "page settings", "finishing", "edit", and "paper feed". FIG. 8 shows a state in which the "page settings" sheet is displayed. On the "page settings" sheet, settings on the original layout can be mainly done.

If the print format has already been set and no further setting such as a change need to be done, the flow advances to step S702 to check whether to set the print format of a chapter or page. If NO in step S702, the processing ends. If the print format of a chapter is to be set, the flow shifts to step S703. The processing in step S703 will be described later with reference to FIGS. 10 and 11. If the print format of a page is to be set, the flow shifts to step S704. The processing in step S704 will be described with reference to FIG. 12. After the print format of a chapter or page has been set, the changed print format is saved in step S705.

Processing (step S703 in FIG. 7) of changing some of the attributes of a specific chapter to different attributes among the set attributes of an entire book will be described with reference to FIGS. 10 and 11.

Figure 11:
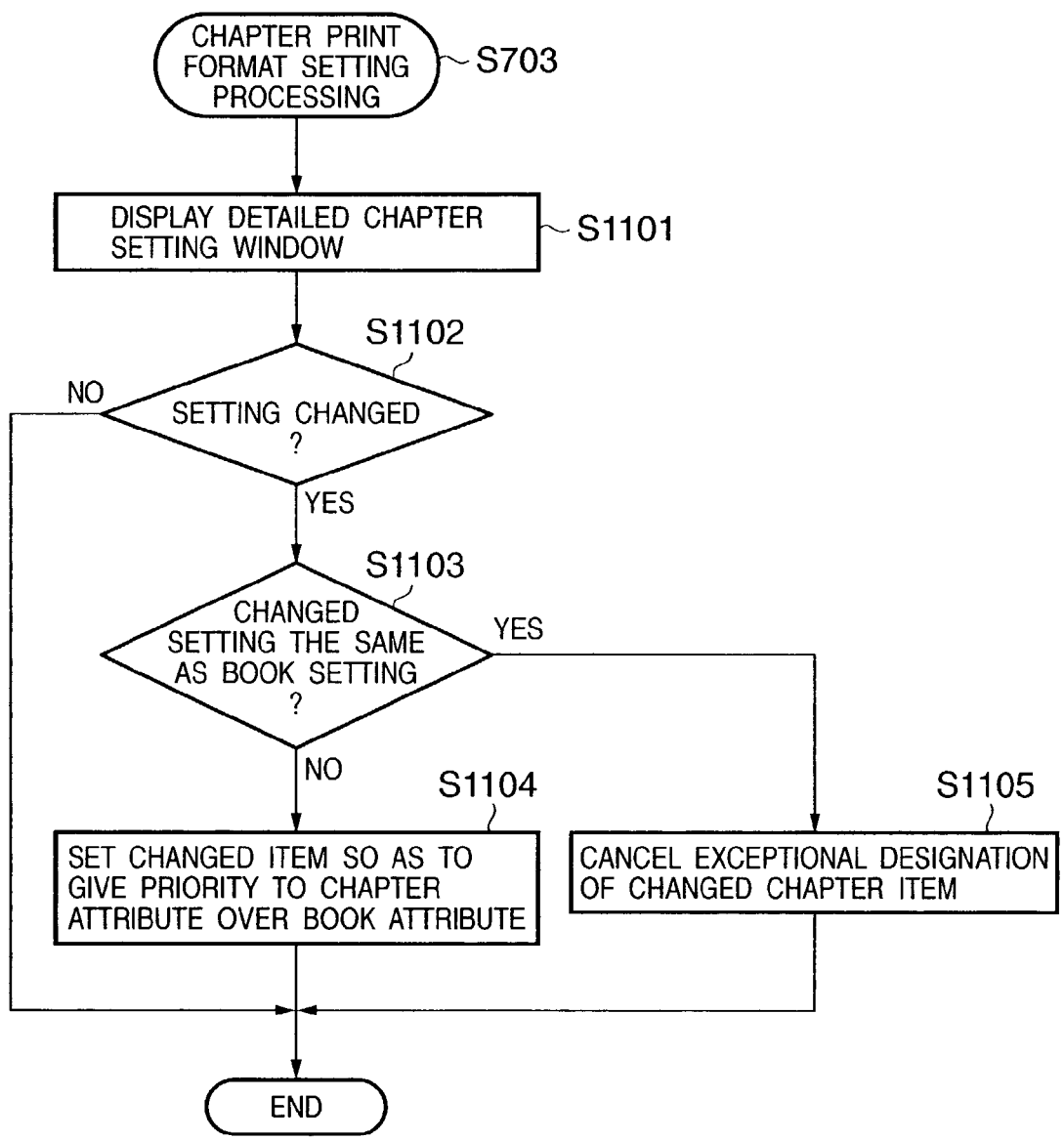
FIG. 11 is a flow chart showing exceptional setting processing (S703 in FIG. 7) for a chapter according to the embodiment of the present invention.

FIG. 11 is a flow chart showing chapter print format setting processing in step S703 of FIG. 7.

If chapter print format designation processing is designated, the "detailed settings of chapter" window which allows setting chapter attributes shown in FIG. 5 is displayed in step S1101. Note that chapter print format designation processing is designated on "detailed settings of chapter" (not shown) of the editing menu on the application operation window in FIG. 9 or the "detailed settings of chapter" button (not shown) on the tool bar.

FIG. 10 shows the "detailed settings of chapter" window of the bookbinding application 104. Similar to the "detailed settings of book" window in FIG. 8, the "detailed settings of chapter" window is constituted by four sheets "page settings", "finishing", "edit", and "paper feed". FIG. 10 shows a state in which the "page settings" sheet is displayed. "Detailed settings of chapter" is basically the same as information which can be set by the page settings of "detailed settings of book" in FIG. 8. "Detailed settings of chapter" further comprises the following three functions.

The output paper setting is made to coincide with that of a book, i.e., "detailed settings of document" (801).

The page layout function is made to coincide with that of the book (802).

The original layout setting is made to coincide with that of the book (803).

By checking a check box 800 in FIG. 8, the setting on the output paper of a chapter can be made to coincide with the book attribute. Similarly, the setting on the page layout of the chapter can be made to coincide with the book attribute by checking a check box 801. The setting on the original layout of the chapter can be made to coincide with the book attribute by checking a check box 802. Note that "to coincide with book" means to coincide with the settings of the entire book.

In step S1102, whether the chapter attribute has been changed is checked. If NO in step S1102, the processing ends; if YES, proceeds to step S1103 to check whether the changed setting coincides with the setting of the book attribute. In this case, whether the changed setting is designation of "coincidence with book" is checked. If YES in step S1103, setting items set in the detailed settings of the book attribute are applied regardless of setting items belonging to the corresponding function group (step S1105).

If NO in step S1103, the flow proceeds to step S1104, and setting items belonging to the corresponding function group reflect the exceptional designation set in the chapter attribute. The function group is a group of print format items having the same attribute. For example, the page layout function is made up of three functions: page layout, layout order, and boundary which belong to the same page layout attribute. Since exception designation is performed for each function group, exception designation can be done in a significant attribute unit. Hence, settings which are unique to the chapter and different from those of the entire book are held.

Figure 12:
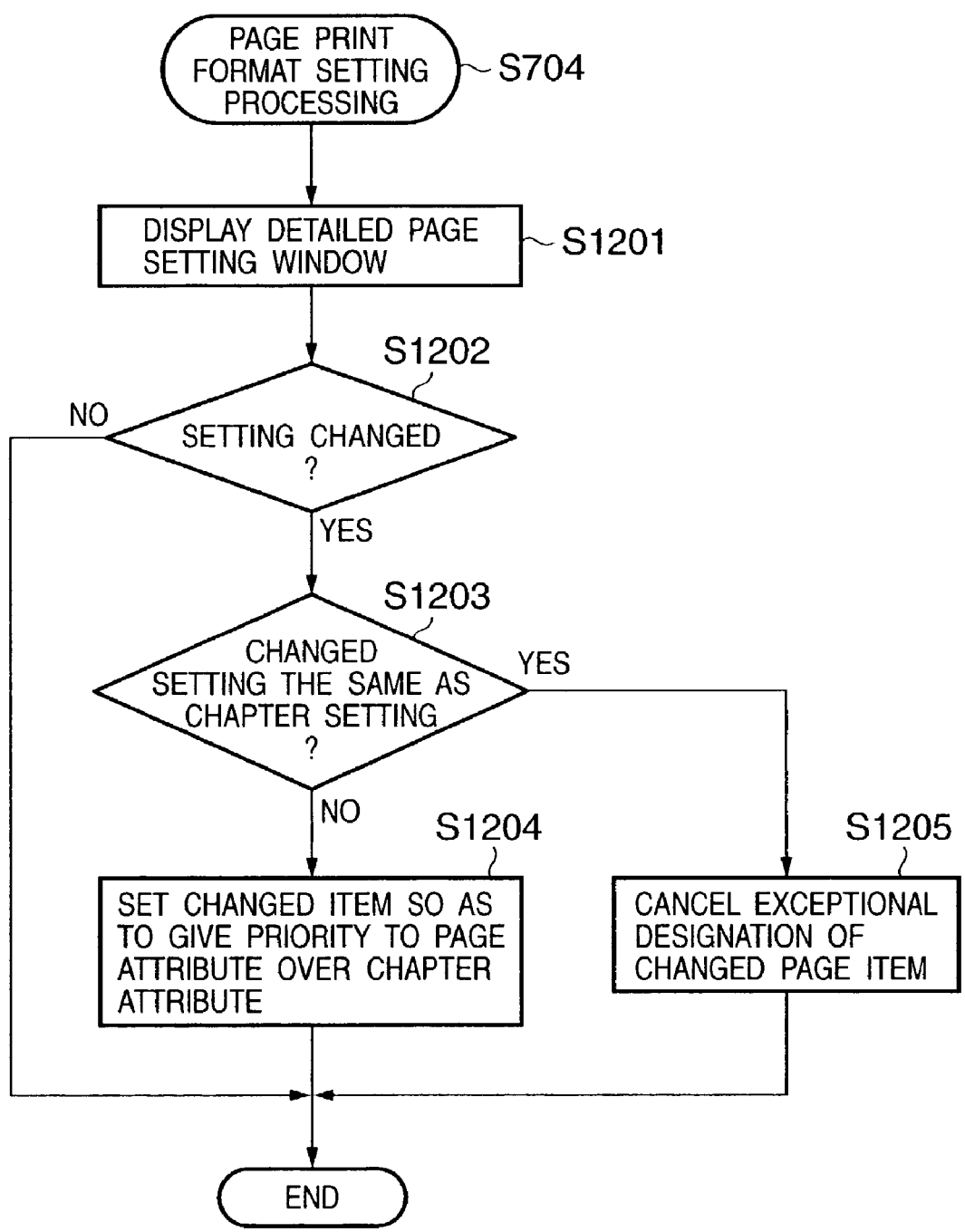
FIG. 12 is a flow chart showing exceptional setting processing (S704 in FIG. 7) for a page according to the embodiment of the present invention.

Similar to attribute information unique to the chapter with respect to book information, attribute information unique to a page included in the chapter can also be set. This processing flow (step S704 in FIG. 7) is shown in FIG. 12. Similar to the detailed setting windows for the book and chapter, this processing is activated from "detailed settings of page" (not shown) of the editing menu on the application operation window in FIG. 9 or the "detailed settings of page" button (not shown) on the tool bar.

FIG. 12 is a flow chart showing page print format setting processing in the document processing system according to this embodiment. The flow chart corresponds to the processing in step S704 of FIG. 7.

If "detailed settings of page" is activated, the flow proceeds to step S1201 to display a "detailed settings of page" window (not shown) which has the same structure as that of the "detailed settings of chapter" window and allows setting page attributes shown in FIG. 6. The "detailed settings of page" window is basically the same as the window in FIG. 8. Instead of "coincide with book" in FIG. 8, a "coincide with chapter" function is added to the "detailed settings of page" window, and displayed with a corresponding check box.

The flow advances to step S1202 to check whether the print format setting of a page has been changed. If NO in step S1202, the processing ends; if YES, proceeds to step S1203 to check whether the changed setting coincides with the setting of a chapter. In this case, whether the changed setting is designation of "coincide with chapter" is checked. If YES in step S1203, the flow advances to step S1205, and setting items set in the detailed settings of the chapter are applied to the settings regardless of setting items belonging to the corresponding function group. When "coincide with chapter" is designated and "coincide with book" is designated in detailed settings of the chapter corresponding to the page, the book attribute is finally applied to the page.

If NO in step S1203, the flow proceeds to step S1204, and setting items belonging to the corresponding function group reflect the exceptional designation set in the chapter. By performing exception designation for each function group, exception designation can be done in a significant attribute unit. Thus, attributes which are unique to the page and different from the settings of the book and chapter attributes can be set.

<Book File Generation Procedures>

The book file has the above-described structure and contents. Procedures of creating a book file by the bookbinding application 104 and electronic original writer 102 will be explained. Creation of a book file is realized as part of book file editing operation by the bookbinding application 104.

Figure 13:
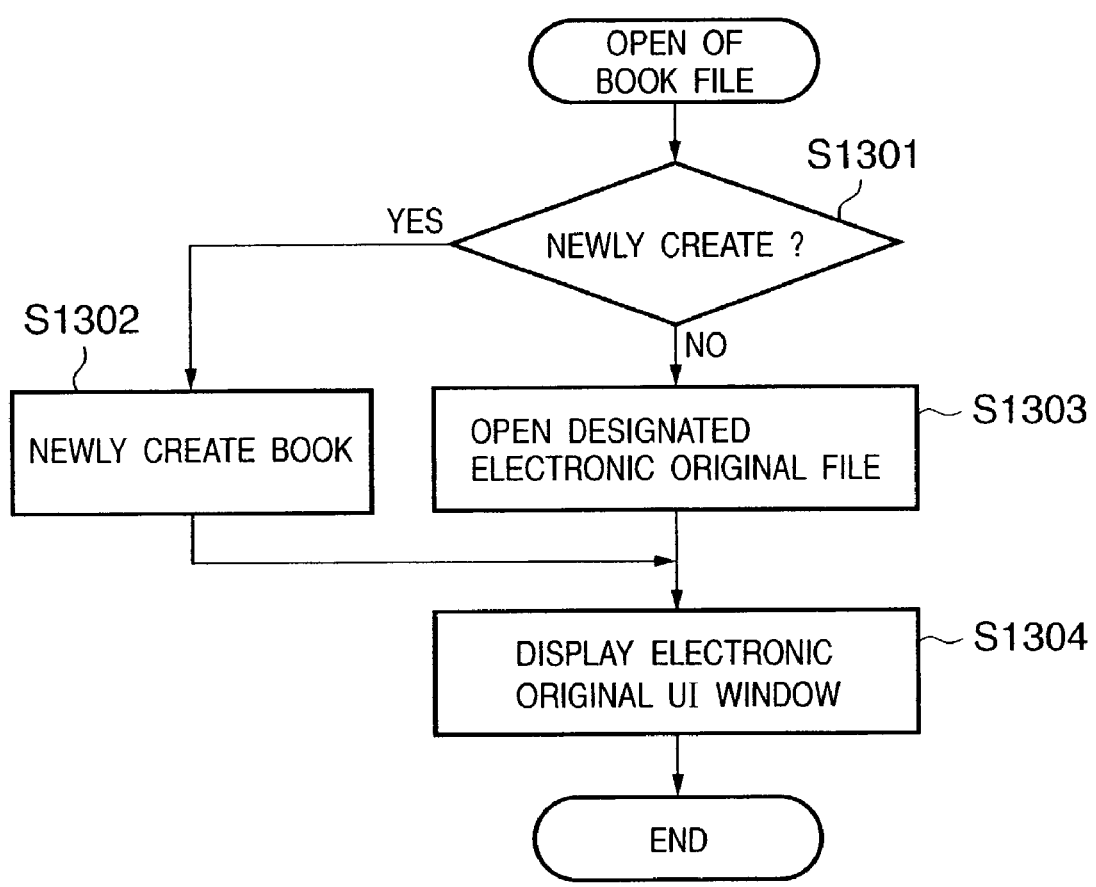
FIG. 13 is a flow chart for explaining procedures of opening a book file in the document processing system according to the embodiment.

FIG. 13 is a flow chart showing procedures when the bookbinding application 104 opens a book file.

In step S1301, whether a book file to be opened is one to be newly created or an existing one is checked. If YES (to be newly created) in step S1301, the flow proceeds to step S1302 to newly create a book file including no chapter. In the example shown in FIGS. 3A and 3B, the newly created book file is a node which has only the book attribute 301 without any link to a chapter attribute node. As the book attribute, a set of attributes prepared in advance for creation of a new book file are applied. Then, the flow proceeds to step S1304 to display a UI (User Interface) window for editing the new book file.

Figure 14:
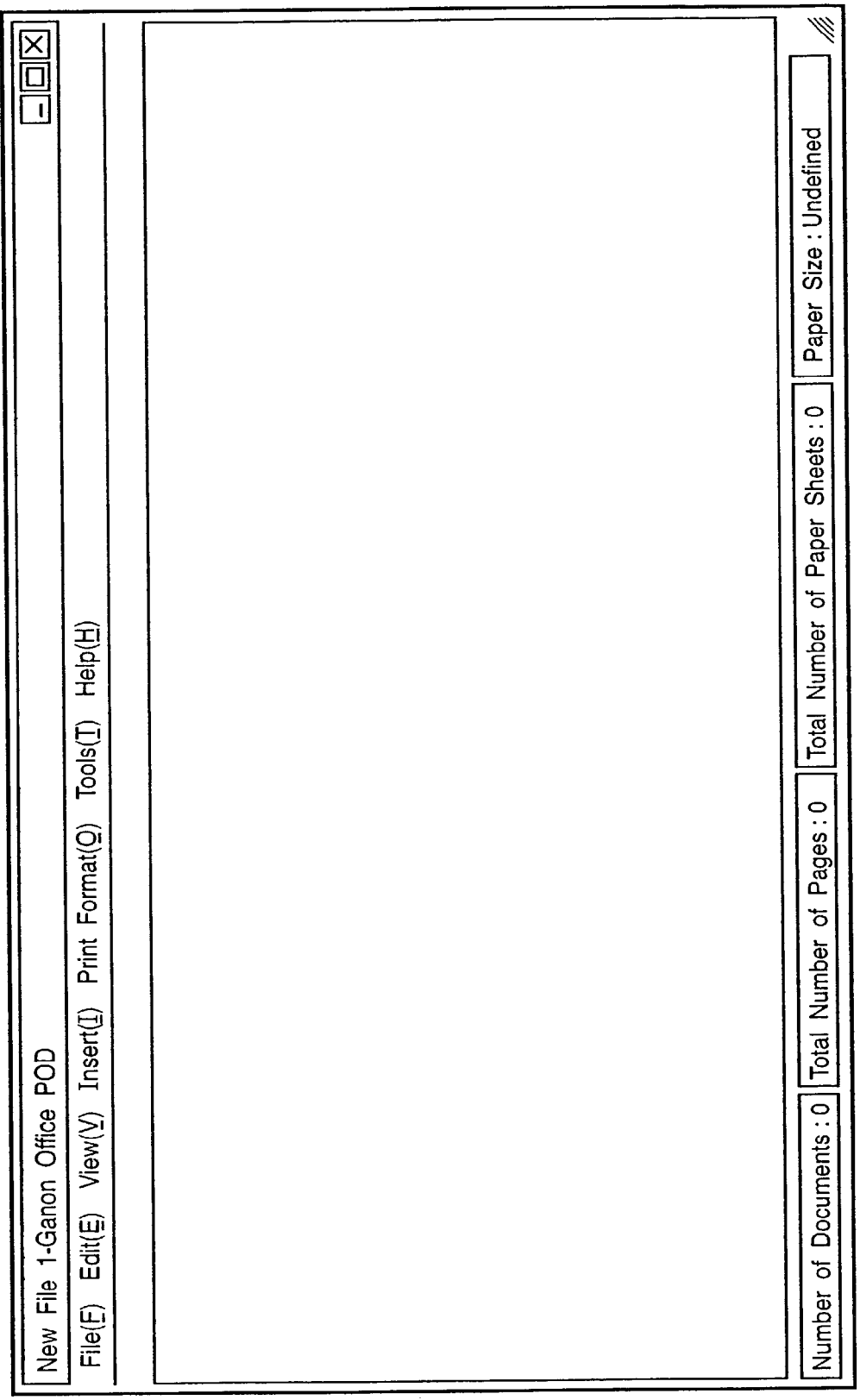
FIG. 14 depicts a view showing an example of a user interface window when a new book file is opened.

FIG. 14 is a view showing an example of the UI window when a book file is newly created. In this case, a UI window 1400 does not display any information because the book file does not have any substantial content.

If NO (existing) in step S1301, the flow proceeds to step S1303 to open a designated book file, and display a UI (User Interface) window in accordance with the structure, attribute, and contents of the book file.

Figure 9:
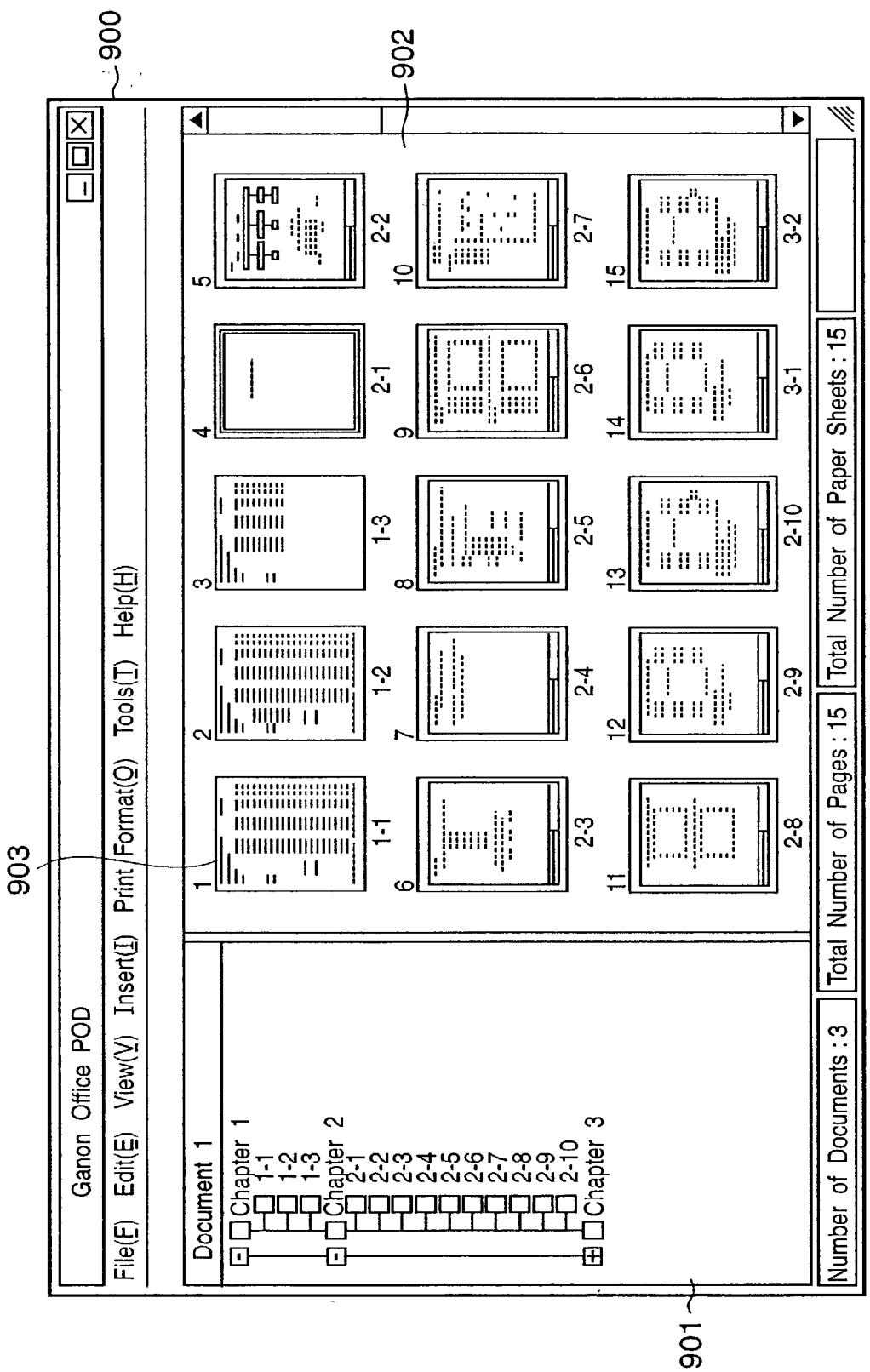
FIG. 9 depicts a view showing an example of a user interface window when an existing book file is opened.

FIG. 9 is a view showing an example of the UI window. A UI window 900 has a tree portion 901 representing a book structure, and a preview portion 902 displaying a state to be printed. The tree portion 901 displays chapters included in the book and pages included in each chapter by a tree structure as shown in FIG. 3A. Pages displayed at the tree portion 901 are original pages. The preview portion 902 displays reduced print page contents. The display order reflects the book structure.

Application data converted into an electronic original file by the electronic original writer 102 can be added as a new chapter to the open book file. This function is called an electronic original import function. By using this function, an electronic original is imported to the book file newly created by the procedures of FIG. 13, giving an entity to the book file. This function is activated by drag-and-drop operation of application data to the window of FIG. 9.

Figure 15:
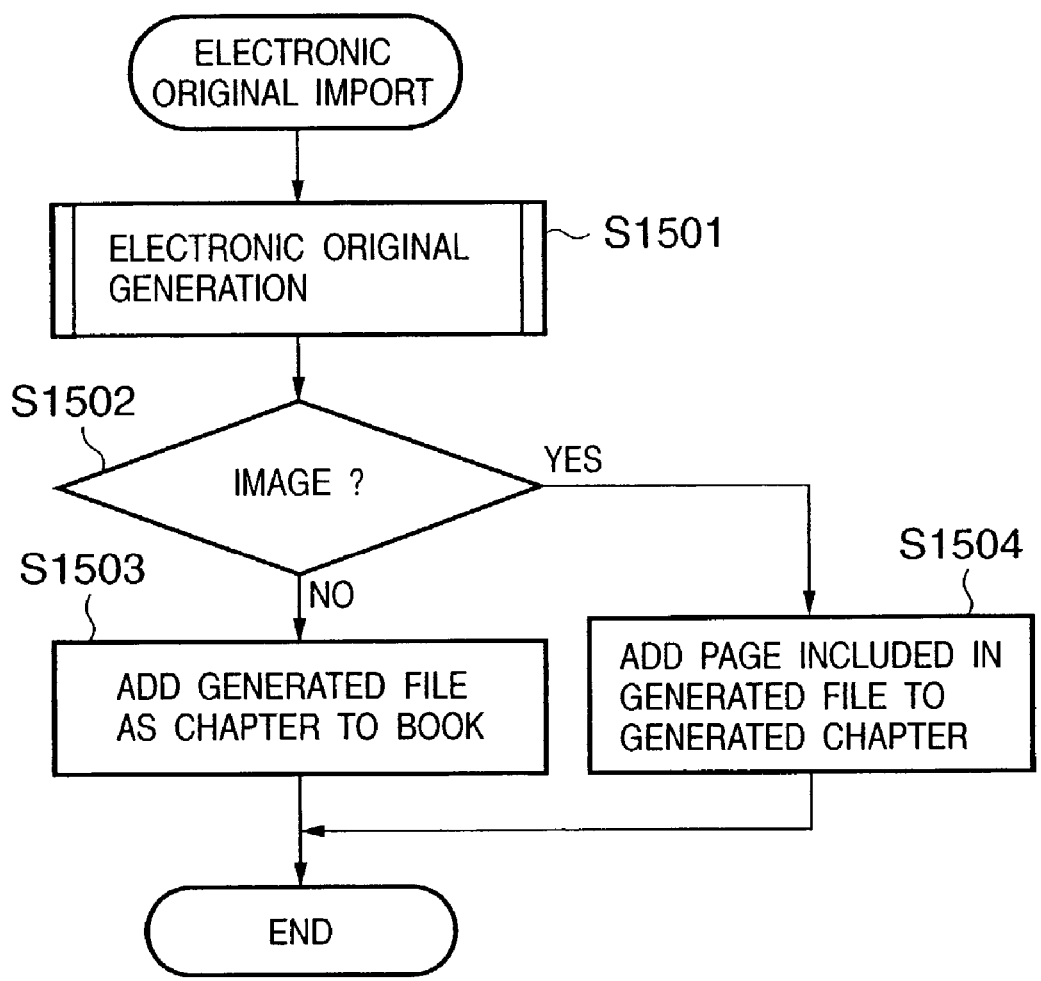
FIG. 15 is a flow chart for explaining procedures of importing an electronic original file into a book file in the document processing system according to the embodiment.

FIG. 15 is a flow chart showing electronic original import procedures.

In step S1501, an application program which has generated designated application data is activated. The electronic original writer 102 is designated as a device driver, and prints out application data to convert it into electronic original data. After conversion, the flow shifts to step S1502 to check whether the converted data is image data. This determination can be achieved based on the file extension of the application under, e.g., the Windows® OS. For example, an extension "bmp" represents bitmap data; "jpg", jpeg-compressed image data; and "tiff", tiff-format image data.

If NO in step S1502, the flow advances to step S1503 to add the electronic original file generated in step S1501 as a new chapter to the book of a currently open book file. As for the chapter attribute, an attribute common to a book attribute is set to a book attribute value, and a different attribute is set to a default value prepared in advance.

If YES in step S1502, the flow advances to step S1504. No new chapter is added in principle, and each original page included in the electronic original file generated in step S1501 is added to a designated chapter. For a file in which a book file is newly created, a new chapter is created, and each page of the electronic original file is added as a page belonging to the chapter. As for the page attribute, an attribute common to an upper layer attribute is given the attribute value of the upper layer attribute, and an attribute which is defined in application data and inherited to the electronic original file is given a value defined in the application data. For example, when N-up designation is defined in application data, the page inherits this attribute value. In this way, a new book file is created, or a new chapter is added.

Figure 16:
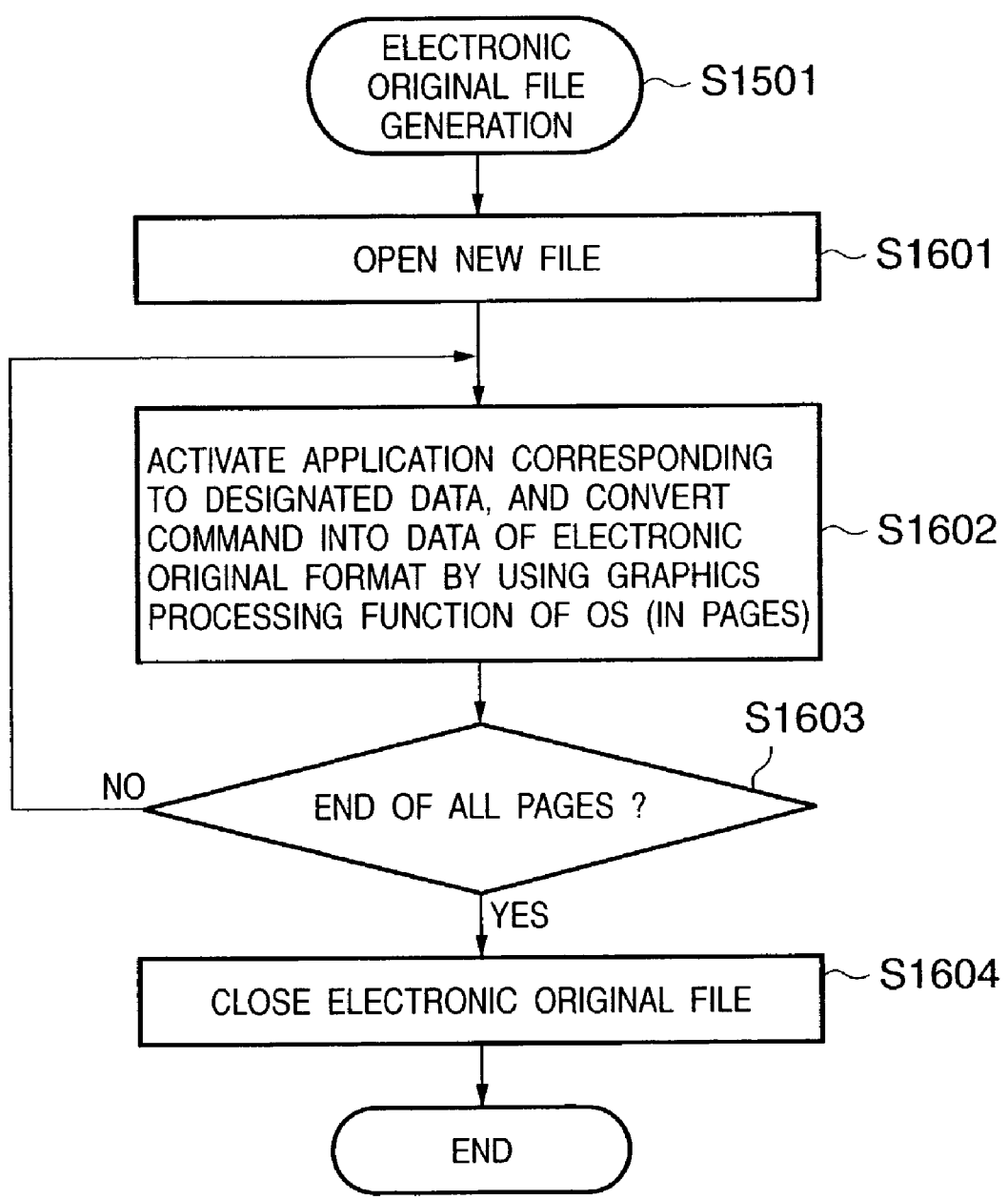
FIG. 16 is a flow chart showing procedures of converting application data into an electronic original file in the document processing system according to the embodiment.

FIG. 16 is a flow chart showing procedures of generating an electronic original file by the electronic original writer 102 in step S1501 of FIG. 15.

In step S1601, a new electronic original file is created and opened. The flow proceeds to step S1602 to activate an application corresponding to designated application data. The electronic original writer 102 is set as a device driver and transmits an output command to the output module of the OS. The output module converts the received output command into data of the electronic original format by the electronic original writer 102, and outputs the converted data. The output destination is the electronic original file opened in step S1601. In step S1603, whether all designated data have been converted is checked. If YES in step S1603, the flow proceeds to step S1604 to close the electronic original file. The electronic original file generated by the electronic original writer 102 is a file containing original page data entities shown in FIG. 3B.

<Editing of Book File>

As described above, a book file can be created from application data. The generated book file allows editing a chapter and page as follows.

(1) New document
(2) Delete
(3) Copy
(4) Cut
(5) Paste
(6) Move
(7) Change chapter name
(8) Reassign page number/name
(9) Insert cover
(10) Insert slip sheet
(11) Insert index sheet
(12) Page layout of each original page In addition, an operation of canceling executed editing operation, and an operation of restoring canceled operation can be performed. These editing functions enable editing operations such as consolidation of a plurality of book files, rearrangement of chapters and pages within a book file, delete of chapters and pages within a book file, layout change of an original page, and insertion of a slip sheet and index sheet. By these operations, operation results are reflected on attributes shown in FIGS. 4A to 6 or on a book file structure. For example, a blank page is inserted into a designated portion by an operation of newly adding a blank page. The blank page is processed as an original page. If the layout of an original page is changed, the change contents are reflected on attributes such as "printing method", "N-up printing", "front/back cover", "index sheet", "slip sheet", and "chaptering".

<Output of Book File>

The ultimate goal of a book file created and edited in the above manner is to print it out. The user selects a file menu from the UI 900 of the bookbinding application shown in FIG. 9, and selects printing from this menu. Then, the book file is printed out from a designated device (e.g., printer 107). At this time, the bookbinding application 104 sets a chapter attribute from the book attribute of a currently opened book file, and sets from the chapter attribute a page attribute positioned below the chapter attribute. If the chapter attribute has an exceptional setting, the exceptional setting value of the chapter attribute is set in the page attribute below the chapter attribute. If the page attribute has an exceptional setting, the exceptional setting value defined in the page attribute is set regardless of the book and chapter attributes on upper layers.

As described above, the bookbinding application 104 according to this embodiment can set attributes for a book, chapter, and page within a book file. The book file has a hierarchical structure described above with reference to FIGS. 3A and 3B. If the book attribute is set to a given value, the chapter attribute below the book attribute is also changed to the same setting value. Similarly, if the chapter attribute is changed, the page attribute below the chapter attribute is also changed. The bookbinding application 104 can designate exceptional settings in the chapter and page attributes. When the chapter or page attribute has an exceptional setting, the setting value of the exceptional setting is applied without reflecting even a change of the upper book or chapter attribute on the lower attribute.

For example, an exceptional setting is designated in the book attribute 301 made up of two chapters and four pages as shown in FIG. 3A. When an output paper size "A4" is set in the book attribute 301, all the page attributes included in the book change to the "A4" size. Also when the output paper size of the book attribute 301 is changed to another value, all the chapter and page attributes change to the same value as that of the book attribute 301.

Assume that an exceptional setting of an output paper size "A3" is designated in the chapter attribute (2) 302B included in the book attribute 301. Then, the output paper sizes of the page attributes 303C and 303D below the chapter attribute 302B also change to "A3". However, even if the book attribute 301 is changed, the change of the book attribute 301 is not reflected on the chapter attribute (2) 302B and its lower page attributes.

After the attribute value of each page is determined in this way, the bookbinding application 104 generates a job ticket for the book file by using the determined attribute value of each page. The bookbinding application 104 sends the generated job ticket to the electronic original despooler 105. The electronic original despooler 105 converts the job ticket into an OS output command, e.g., a Windows® GDI command, and transmits the command to an output module, e.g., GDI. The output module generates a command complying with the printer 107 by a designated printer driver 106, and transmits the command to the printer 107.

FIG. 17 is a view for explaining an example of the job ticket.

In FIG. 17, data 1700, 1701, and 1702 define pieces of information for printing the first, second, and third pages. Data 1710 represent paper sizes (A4 size for the first and second pages, and A3 size for the third page). Data 1711 represent image data to be printed. Detailed contents of the image data are represented by data 1703 to 1705, which correspond to the first, second, and third image data, respectively.

The job ticket is data with a structure whose minimum unit is an original page. The data structure of the job ticket defines the layout of an original page on paper. One job ticket is issued for one job. A document node is set at the top of the structure (not shown in FIG. 17), and defines the attribute of the whole document such as double-sided printing/single-sided printing. A paper node shown in FIG. 17 belongs to the document node, and contains attributes such as the identifier of paper for use and designation of a feed port in the printer. A node for a sheet printed by the paper belongs to each paper node. One sheet corresponds to one paper sheet. A print page (physical page) belongs to each sheet. One physical page belongs to one sheet for single-sided printing, and two physical pages belong to one sheet for double-sided printing. An original page (Signature-Name=" ") to be laid out on a physical page belongs to the physical page. The physical page attribute contains an original page layout.

The electronic original despooler 105 converts the job ticket into an output command to the output module.

<Another System Configuration>

The document processing system of this embodiment has generally been described. This system is of stand-alone type. A server-client system as an extension of the stand-alone system also creates and edits a book file by almost the same arrangement and procedures. A book file and print processing are managed by the server.

Figure 18:
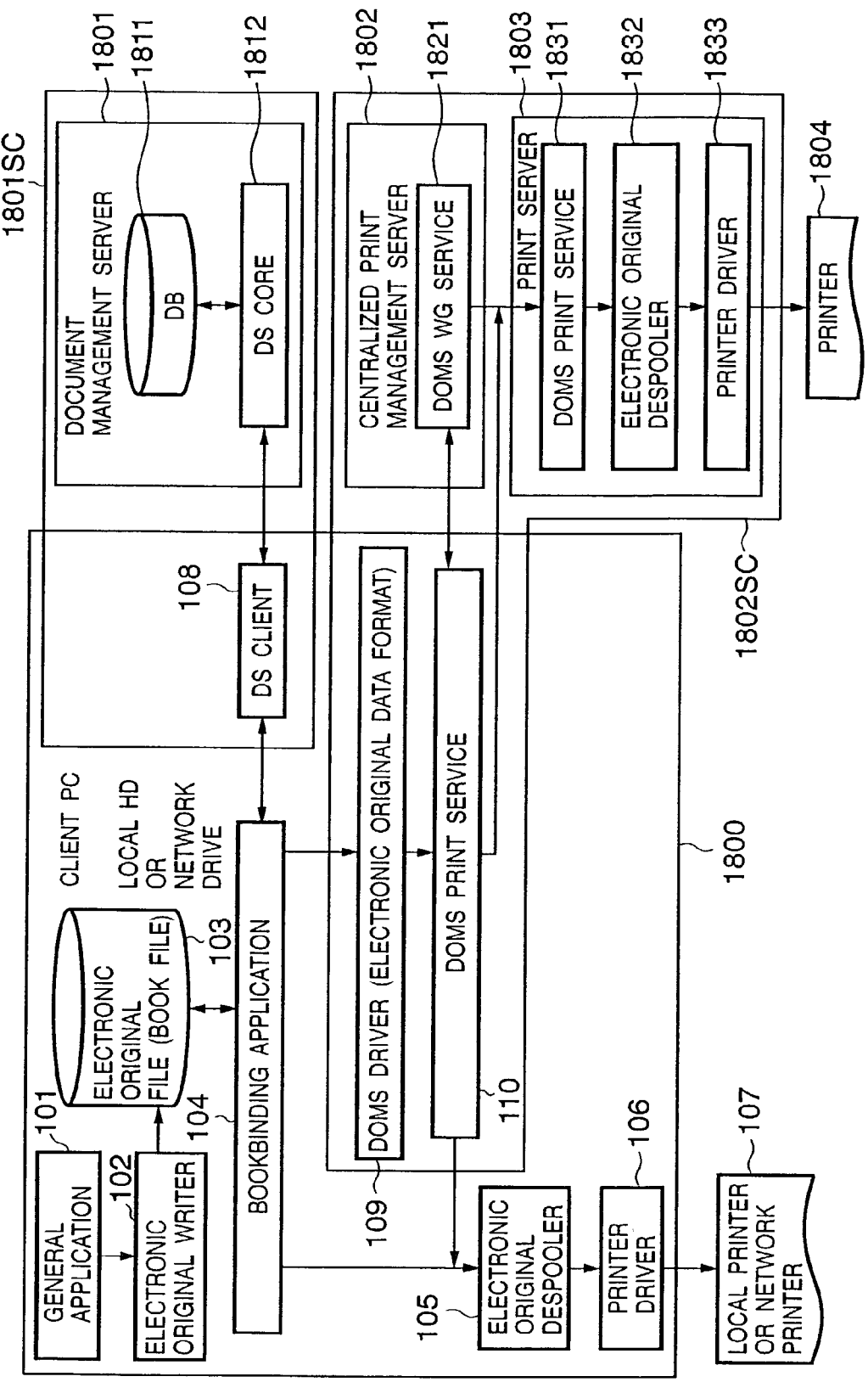
FIG. 18 is a block diagram showing a client-server document processing system in the document processing system according to the embodiment.

FIG. 18 is a block diagram showing the arrangement of a server-client document processing system.

A client document processing system 1800 is constituted by adding to the stand-alone system a DOMS (Document Output Management Service) driver 109, DOMS print service module 110, and DS (Document Service) client module 108 serving as client modules. The client document processing system 1800 is connected to a document management server 1801, centralized print management server 1802, and print server 1803. These servers 1802 and 1803 are generally connected to the client via a network. When the servers also function as clients, they are connected by interprocess communication which simulates communication between networks. The document management server 1801 and centralized print management server 1802 are connected to the client in FIG. 18, but only either one may exist on the network. If the connected server is the document management server 1801, a document management server-client system 1801SC including a client module is added to the stand-alone document management system. If the connected server is the centralized print management server 1802, a print management server-client system 1802SC including a client module is added.

The document management server 1801 stores a book file created and edited by the bookbinding application 104. To manage a book file by the document management server 1801, the book file is saved in a database 1811 of the document management server 1801 instead of or in addition to the local HD of a client PC. Save and read of a book file between the bookbinding application 104 and the document management server 1801 are done via the DS client module 108 and a DS core 1812.

The centralized print management server 1802 manages printing of a book file stored in the client document processing system 1800 or document management server 1801. A print request from the client is transmitted to a DOMS WG server module 1821 of the centralized print management server 1802 via the DOMS driver 109 and DOMS print service module 110. To print a book file by the printer 107 of the client, the centralized print management server 1802 transfers electronic original data to the electronic original despooler 105 via the DOMS print service module 110 of the client. To print a book file by the print server 1803, the centralized print management server 1802 transmits electronic original data to a DOMS print service module 1831 of the print server 1803. For example, the centralized print management server 1802 executes security check on the qualification of a user who has issued a print request for a saved book file, or saves the print processing log. In this fashion, the document processing system according to this embodiment can be implemented as both a stand-alone system and client-server system.

<Contents of Preview Display>

As described above, when a book file is opened by the bookbinding application, the user interface window 900 shown in FIG. 9 is displayed. The tree portion 901 displays a tree representing the structure of the open book (to be referred to as a "book of interest" hereinafter). The preview portion 902 has three display methods in accordance with user designation. The first method is an original view mode where original pages are directly displayed. In the original view mode, the contents of original pages belonging to a book of interest are reduced and displayed. The display at the preview portion 902 does not reflect any layout of each page in the original view mode. The second method is a print view mode. In the print view mode, the preview portion 902 displays original pages in accordance with the layout of the original pages. The third method is a simple print view mode. In the simple print view mode, the contents of each original page are not reflected on the display at the preview portion 902, and only the layout of the original pages is reflected.

The document processing system according to this embodiment has generally been described. This system is of stand-alone type. A server-client system as an extension of the stand-alone system also creates and edits a book file by almost the same arrangement and procedures. A book file and print processing are managed by the server.

Before a description of the features of another embodiment of the present invention, the arrangement of a document processing system having a host computer 100 and printer 107 which can be applied to this embodiment will be explained. The arrangement of the host computer 100 is the same as that described above with reference to FIG. 2. The same reference numerals denote the same parts, and a description thereof will be omitted. The printer 107 can be a local printer connected to a client or a printer 1204 connected to a server.

FIG. 19 is a block diagram for explaining the arrangement of the document processing system according to the embodiment of the present invention. As long as functions according to this embodiment are executed, the present invention can be applied to a single device, a system made up of a plurality of devices, or a system which is connected via a LAN, WAN, or the like and performs processing. The arrangement of the host computer 100 is the same as that described above with reference to FIG. 2, and a description thereof will be omitted.

The printer 107 is controlled by a CPU 12. The CPU 12 outputs an image signal as output information to a printing unit (printer engine) 17 connected to a system bus 15 on the basis of a control program stored in the program ROM of a ROM 13 or a control program which is stored in an external memory 14 and loaded to a RAM 19. The program ROM of the ROM 13 stores the control program for the CPU 12. The font ROM of the ROM 13 stores font data or the like used to generate the output information. The data ROM of the ROM 13 stores information used by the host computer 100 for a printer which does not comprise the external memory 14 such as a hard disk.

The CPU 12 can communicate with the host computer 100 via an input unit 18, and notify the host computer 100 of information of the printer 107 or the like. The RAM 19 functions as the main memory or work area of the CPU 12. The memory capacity of the RAM 19 can be expanded by an optional RAM connected to an expansion port (not shown). The RAM 19 is used as an output information mapping area, environment data storage area, NVRAM, or the like. The access of the external memory 14 such as a hard disk (HD) or IC card is controlled by a memory controller (MC) 20. The external memory 14 is connected as an option, and stores font data, emulation programs, form data, and the like. An operation panel 21 comprises operation switches, LED display, and the like.

The number of external memories 14 is not limited to one. A plurality of external memories including an optional card which store programs for interpreting the printer control languages of different language systems in addition to internal fonts may be connected. An NVRAM (not shown) may be arranged to store printer mode setting information from the operation panel 21.

The host computer 100 comprises the files, application, despooler, driver, and the like described above with reference to FIG. 1. An application 101 displays an operation window as shown in FIG. 9 on a display 210. The application realizes editing functions such as replacement of document pages, copy, and delete, and function settings of the printer 107 such as staple and punch. The application allows the user to print data by using a designated printer.

Figure 20A:
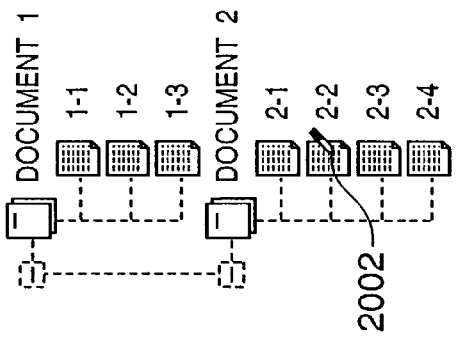
FIGS. 20A to 20C depict views showing examples of the tree view display of a document structure when a chapter or page in a document has a different setting from that of the entire document in another embodiment of the present invention.
Figure 20B:
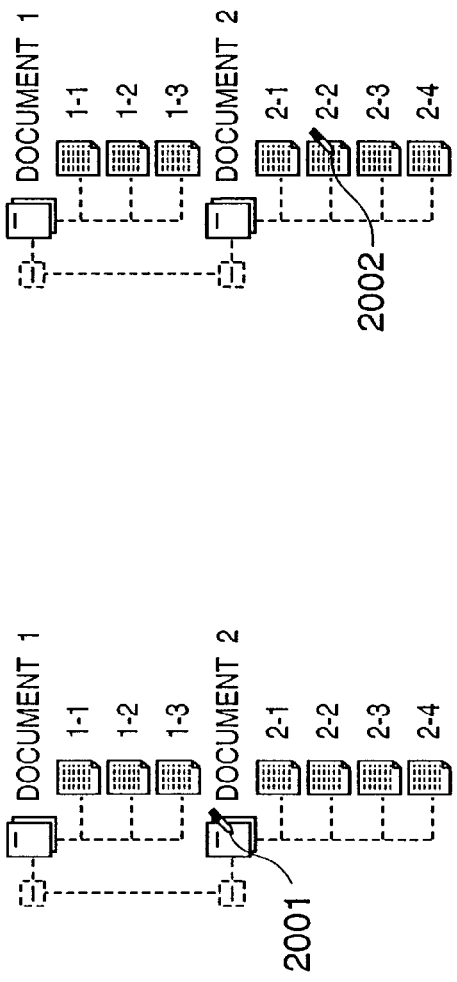
Figure 20C:
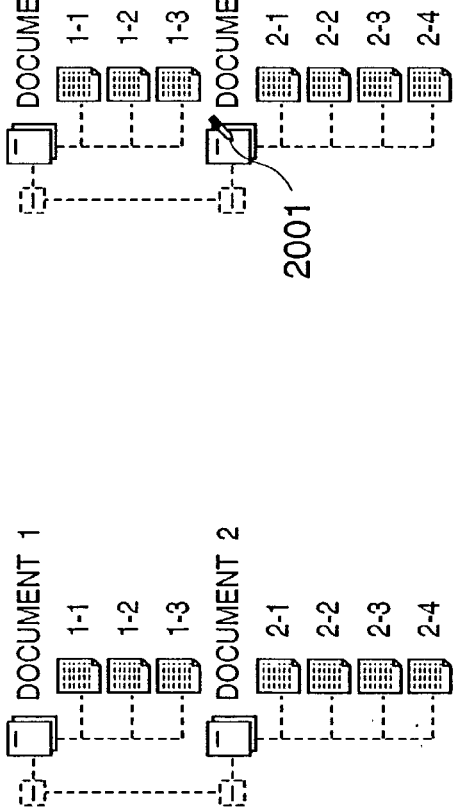

FIGS. 20A to 20C show tree view display examples of a document structure including chapters and pages which hold unique attribute information according to the embodiment. These tree views are displayed at a tree portion 901 in the window of FIG. 9. FIG. 20A shows a case wherein a common attribute is set throughout a book. FIG. 20B shows a case wherein the second chapter in the book is set to a different attribute from the book attribute. FIG. 20C shows a case wherein page 2—2 in the second chapter of the book is set to a different attribute from the book or chapter attribute.

When all chapters and pages are set to an attribute common to "detailed settings of book", as shown in FIG. 20A, an icon representing that the attribute is common throughout the book is adopted. When a chapter is set to a unique attribute different from "detailed settings of book" (FIG. 20B), a pencil mark 2001 is displayed together with the icon of the chapter (document 2) including the unique attribute so as to represent that the chapter is set to the unique attribute. With the pencil mark 2001, the chapter including the unique attribute and a chapter including no unique attribute can be identified at a glance.

If a given chapter contains a page including a unique attribute, a pencil mark 2002 is displayed together with the icon of the page (page 2—2) including the unique attribute, similar to the chapter (FIG. 20C). The page including the unique attribute and a page including no unique attribute can be identified at a glance. Such an icon is designated with a mouse, the mouse is left-clicked, and then the detailed setting window of a corresponding chapter or page is displayed. While the detailed settings are displayed, the setting state of the chapter or page having a unique attribute can be changed.

Figure 21:
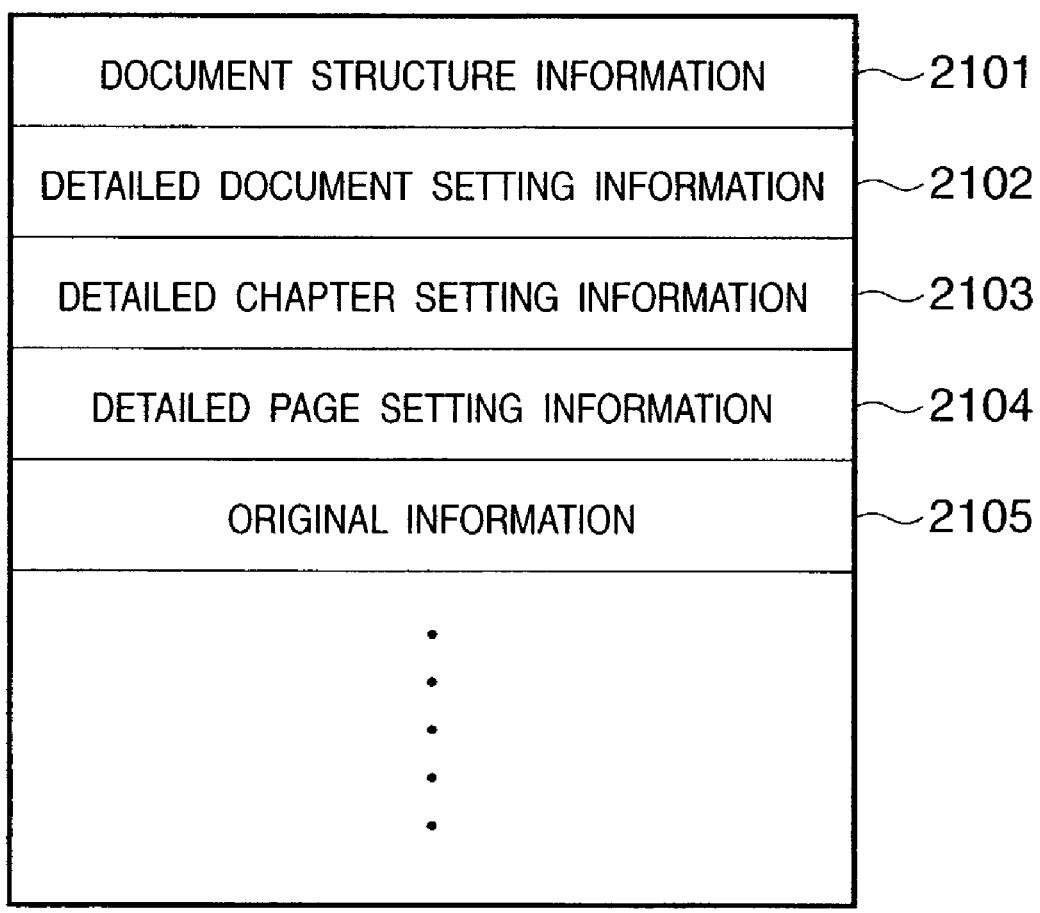
FIG. 21 depicts a view showing a data structure of a document file according to the embodiment shown in FIGS. 20A to 20C.

FIG. 21 is a view for explaining the data structure of a document file processed by the application 101 according to this embodiment. The document file corresponds to the electronic original file 103 in FIG. 1. The document file is stored in an external memory 211 in FIG. 19, but may be stored in a database 1811 of a document management server 1801 in FIG. 18.

In FIG. 21, document structure information 2101 stores information about a document structure displayed at the tree portion 901 of the application operation window shown in FIG. 9. Detailed document setting information 2102 is an area for recording information settable for the entire document. The detailed document setting information 2102 stores information set by using the "detailed settings of book" window shown in FIG. 8. Detailed chapter setting information 2103 is an area for recording information settable for each chapter. The detailed chapter setting information 2103 stores information set by using the "detailed settings of chapter" window shown in FIG. 10. Detailed page setting information 2104 is an area for recording information settable for each page. The detailed page setting information 2104 can hold the setting of a setting item changeable for each page in "detailed settings of page" from detailed settings of a book or chapter, similar a setting item changeable in "detailed settings of chapter" from "detailed settings of book". Original information 2105 stores drawing information of each original page, and holds information of each page used for display at a preview portion 902 on the right side of FIG. 9. Note that the document file includes another information necessary for each document, but a description thereof will be omitted.

Figure 22:
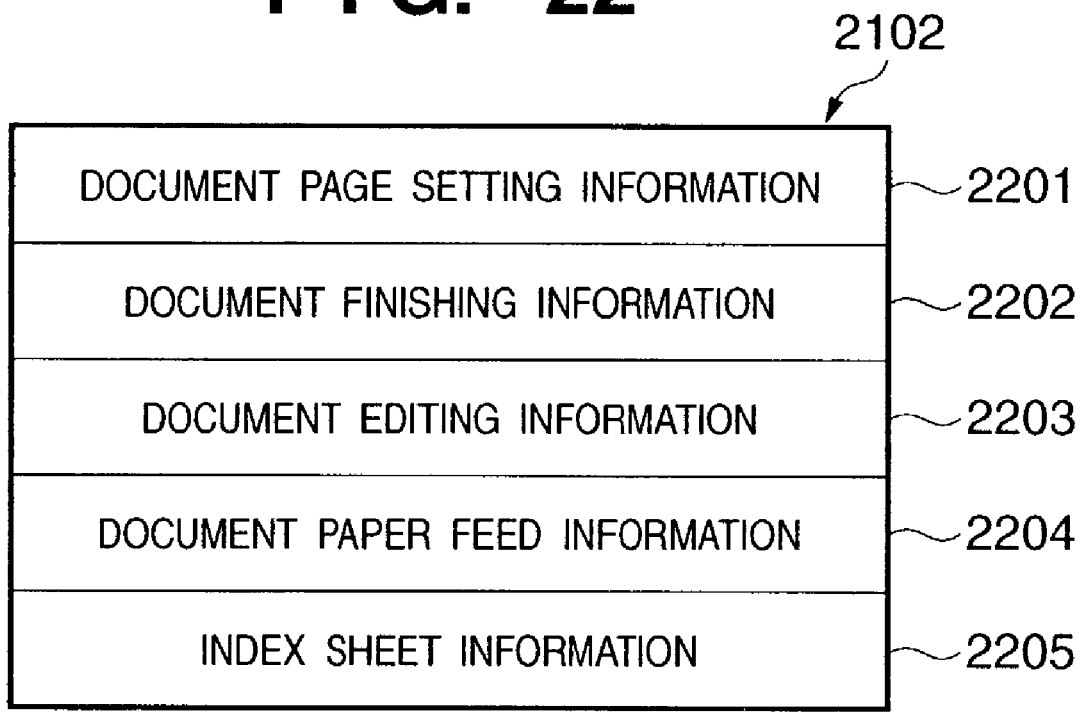
FIG. 22 depicts a view showing a data structure of detailed document setting information according to the embodiment shown in FIGS. 20A to 20C.

FIG. 22 is a view for explaining in more detail the data structure of the detailed document setting information 2102 in FIG. 21.

Reference numeral 2201 denotes document page setting information; numeral 2202 denotes document finishing information; numeral 2203 denotes document editing information; numeral 2204 denotes document paper feed information; and numeral 2205 denotes index sheet information. These pieces of information are stored as the detailed document setting information 2102. These pieces of information coincide with contents set in the "page settings", "finishing", "edit", and "paper feed" sheets of the "detailed settings of book" window shown in FIG. 8.

Figure 23:
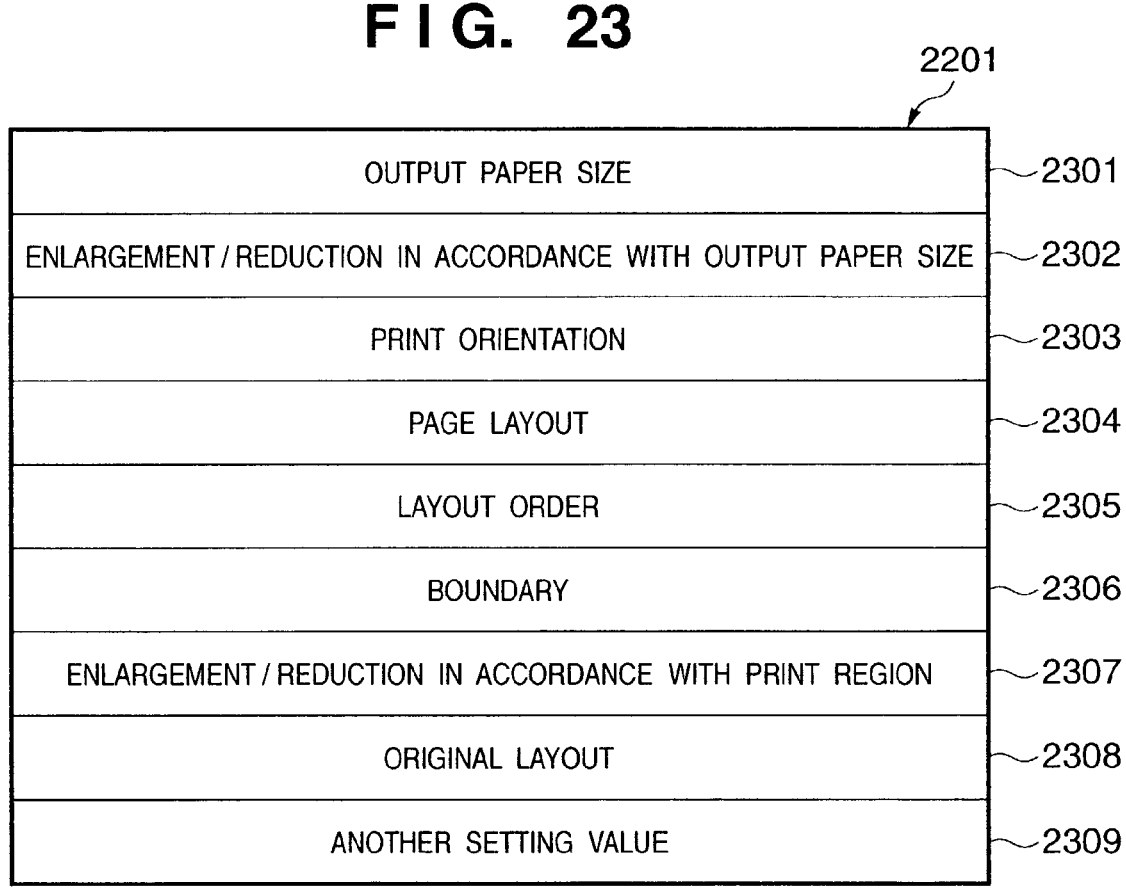
FIG. 23 depicts a view showing document page setting information according to the embodiment shown in FIGS. 20A to 20C.

FIG. 23 is a view showing, in more detail, document page setting information represented by the document page setting information 2201 in FIG. 22.

Reference numeral 2301 denotes an output paper size; numeral 2302 denotes information representing whether to enlarge/reduce an original in accordance with the output paper size; numeral 2303 denotes a print orientation; numeral 2304 denotes a page layout; numeral 2305 denotes a layout order; numeral 2306 denotes a boundary; numeral 2307 denotes information whether enlargement/reduction of an original in accordance with the print region is designated; numeral 2308 denotes an original layout; and numeral 2309 denotes another setting value. These pieces of information coincide with contents set in "page settings" of the "detailed settings of book" window shown in FIG. 8.

Figure 24:
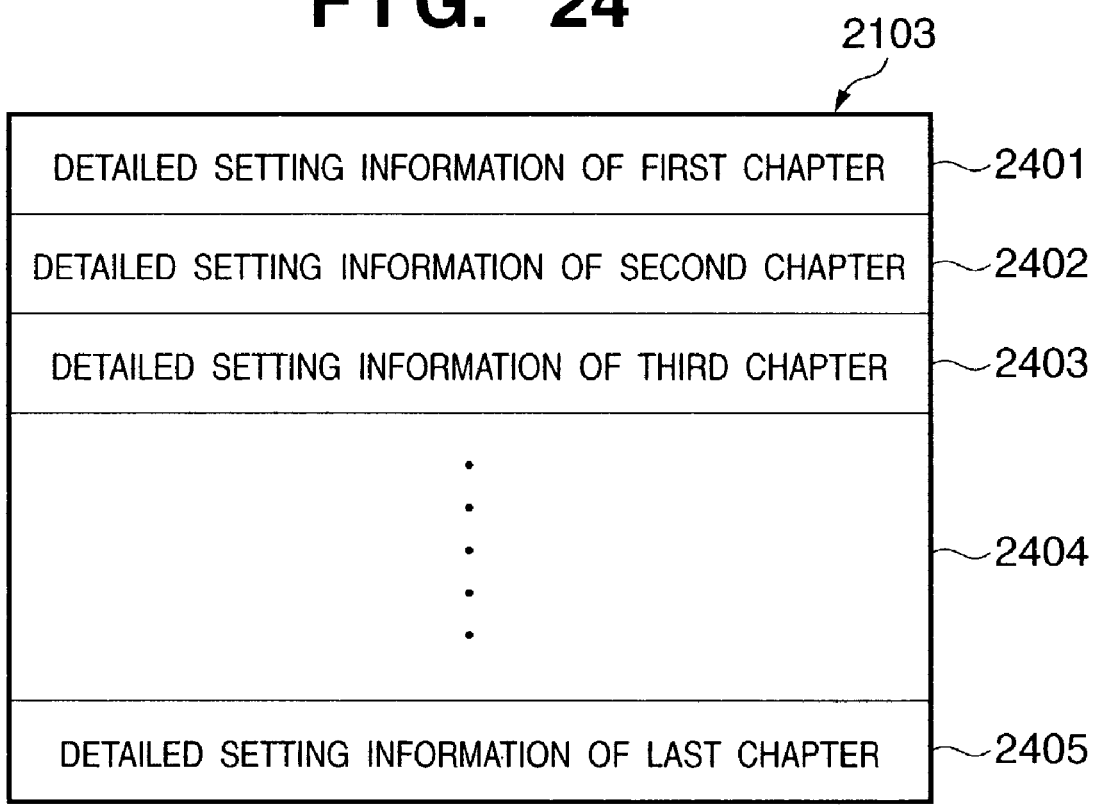
FIG. 24 is a view showing detailed setting information of each chapter according to the embodiment shown in FIGS. 20A to 20C.

FIG. 24 is a view showing in more detail the data structure of the detailed chapter setting information 2103 shown in FIG. 21.

Pieces of detailed setting information (2401 to 2405) of chapters from the first chapter to the last chapter are stored.

Figure 25:
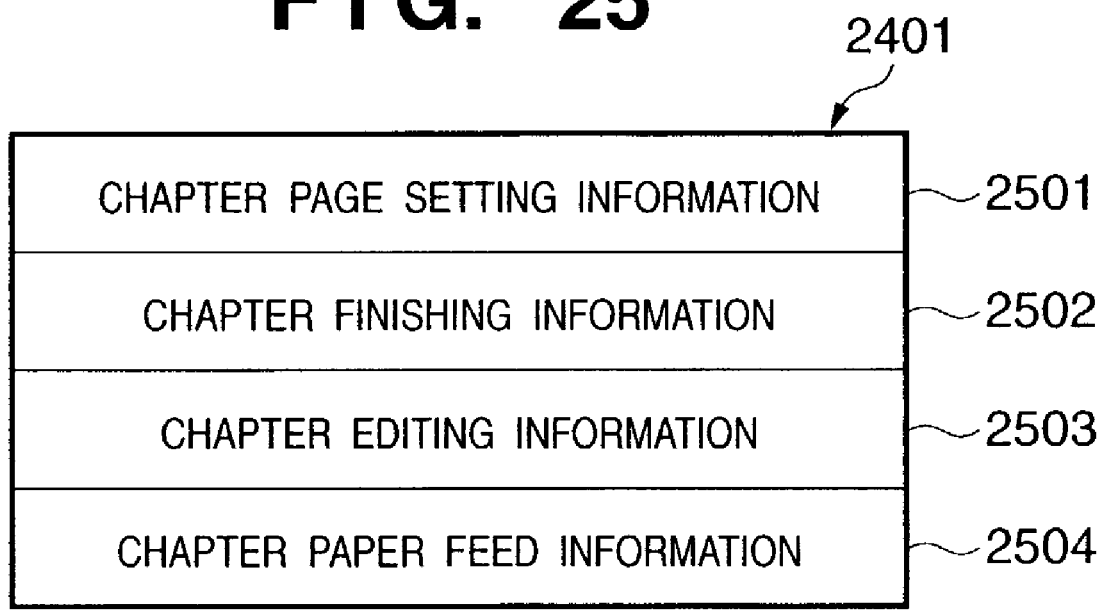
FIG. 25 depicts a view for explaining the data structure of page setting information of each chapter.

FIG. 25 is a view for explaining the data structure of each of the pieces of detailed setting information (2401 to 2405) of chapters shown in FIG. 24.

In FIG. 25, reference numeral 2501 denotes chapter page setting information which stores the name of a chapter; numeral 2502 denotes chapter finishing information; numeral 2503 denotes chapter editing information; and numeral 2504 denotes chapter paper feed information. These pieces of information are stored as detailed setting information of each chapter. These pieces of information coincide with contents set in the "page settings", "finishing", "edit", and "paper feed" sheets of the "detailed settings of chapter" window shown in FIG. 10.

Figure 26:
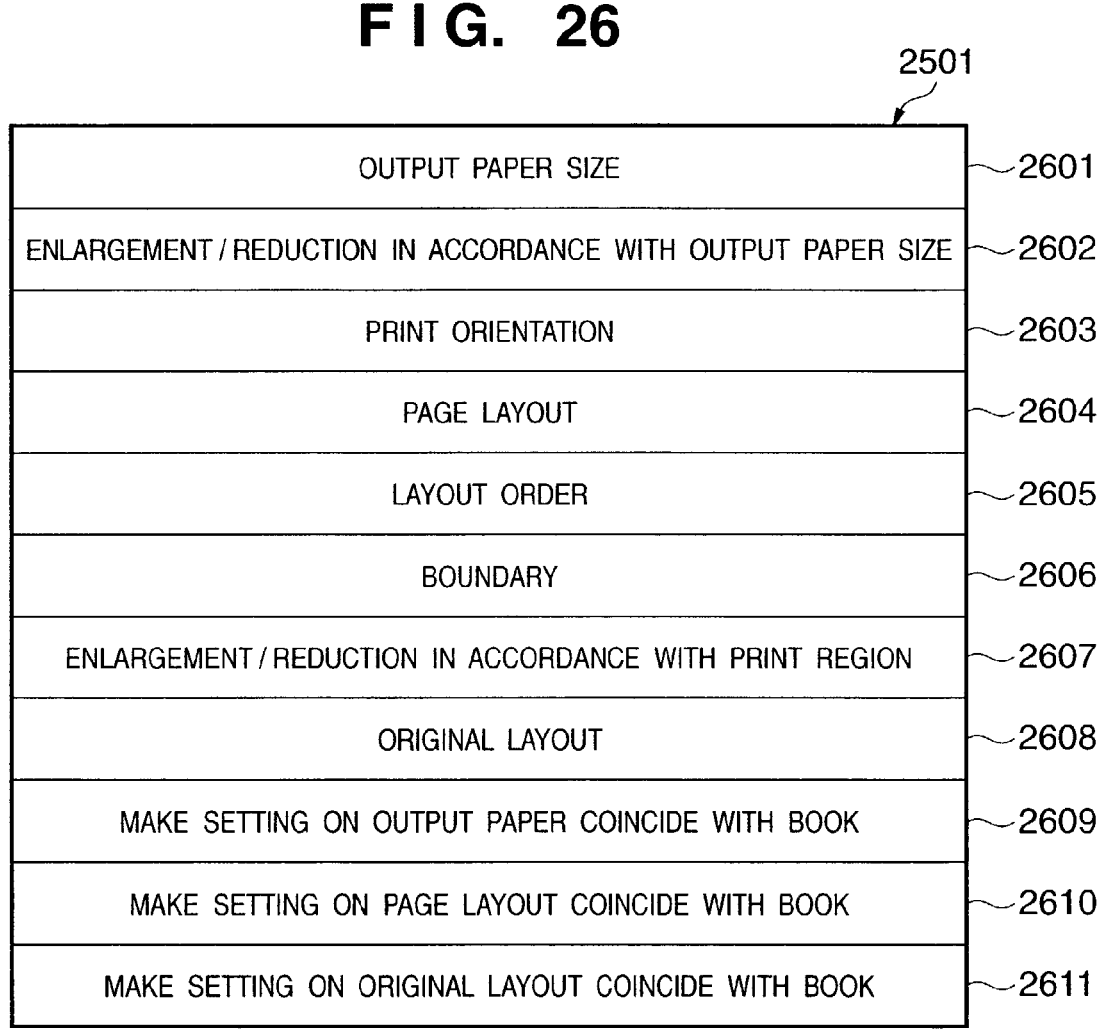
FIG. 26 depicts a view showing page setting information of each chapter.

FIG. 26 is a view for explaining the page setting information 2501 of each chapter in FIG. 25 in more detail.

The chapter page setting information stores the same information (2601 to 2608) as the document page setting information 2201 in FIG. 23. Reference numeral 2609 denotes setting information to "make output paper setting coincide with book"; numeral 2610 denotes setting information to "make page layout setting coincide with book"; and numeral 2611 denotes setting information to "make original layout setting coincide with book". These pieces of information coincide with the contents set in check boxes 801 to 803 in the "page settings" sheet of the "detailed settings of chapter" window shown in FIG. 10.

Figure 27:
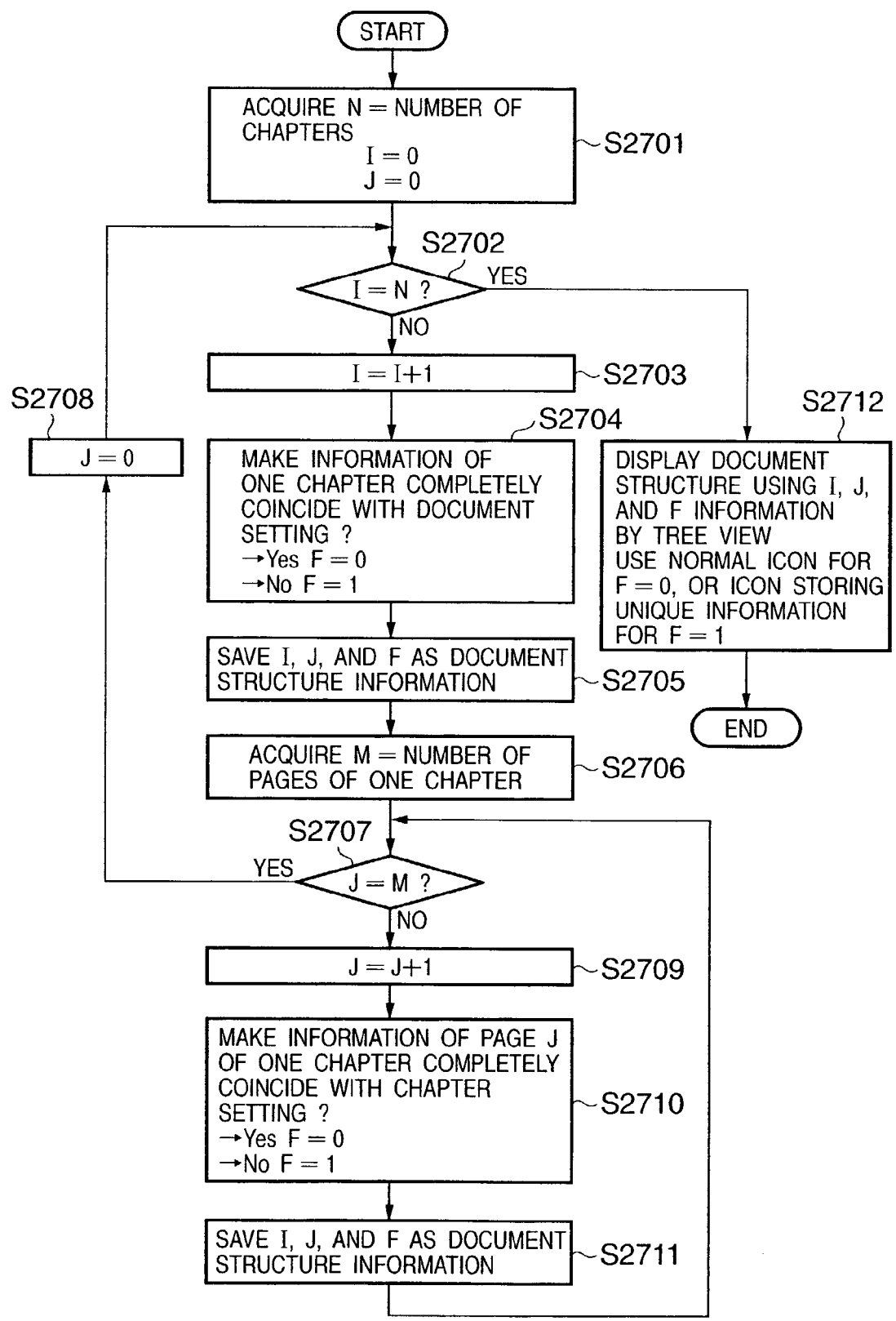
FIG. 27 is a flow chart showing details of print processing by an application in the document processing system according to the embodiment shown in FIGS. 20A to 20C.

FIG. 27 is a flow chart showing details of print processing by the application 101 in the document processing system according to the embodiment.

In step S2701, the application 101 acquires the number of chapters included in a document file during editing. At this time, a variable I for counting the number of chapters and a variable J for counting the number of pages are set to "0". The flow proceeds to step S2702 to check whether the current chapter is the last chapter (N). If NO in step S2702, the flow advances to step S2703 to increment the variable I by 1. In step S2704, it is checked whether information representing that the settings of the chapter are made to coincide with those of the document is contained in the current chapter (first chapter at the beginning), i.e., similar information is contained in the pieces of information 2609 to 2611 shown in FIG. 26, and the chapter finishing information 2502, chapter editing information 2503, and chapter paper feed information 2504 in FIG. 25 in the chapter page settings. If even one information is not contained, a flag F representing that the settings of the book and the settings of the chapter are different from each other is set to "1". If all the attributes are so set as to coincide with the book attributes, the flag F is set to "0". This flag information is set as icon information of the current chapter.

The flow shifts to step S2705 to save a chapter number, page number, and flags (I, J, and F) as pieces of chapter information. The page number J of "0" means chapter information. The flow advances to step S2706 to acquire the number (M) of pages included in the chapter. In step S2707, whether the current page is the last page of the chapter is checked. If NO in step S2707, the flow advances to step S2709 to increment the page number by 1 (J=J+1). In step S2710, whether information of the page represented by J is so set as to coincide with all the chapter attributes. If even one page which is not made to coincide with the chapter attributes exists, the flag F of this page is set to "1". If all the pages are so set as to coincide with the chapter attributes, the flag F of the page is set to "0", which is set as icon information of the chapter. The flow proceeds to step S2711 to save a chapter number, page number, and flags (I, J, and F) as pieces of page information.

After pieces of page information are generated up to the last page of the chapter, the flow advances from step S2707 to step S2708 to reset the variable J representing a page number to "0". The flow proceeds to step S2702 to generate information of the next chapter.

This processing is repeated up to the last chapter, completing information for generating a document structure. Then, the flow advances from step S2702 to step S2712 to perform document information display processing. In this case, icons used for a chapter and page are determined based on the chapter, the page, and their flag information. For example, for a page number "0" meaning chapter information, a chapter icon is displayed. For a page number other than "0" meaning page information, a page icon is displayed. The flag F of "1" for both the chapter and page represents a unique chapter and page, and corresponding icons (2001 and 2002 in FIGS. 20B and 20C) are added and displayed.

For example, if a chapter setting which does not coincide with a book setting or a page setting which does not coincide with a chapter or book setting exists in step S2704 or S2710, information in which the flag F is set is used in this flow chart. Alternatively, information representing a function which is not made to coincide with the setting may be saved.

In this way, the pencil mark 2001 or 2002 can be displayed together with the icon of a chapter whose attribute is different from a book attribute or the icon of a page whose attribute is different from a chapter attribute, as shown in FIGS. 20B and 20C.

The page settings according to this embodiment include "output paper size", "page layout", and "original layout" functions. Of these functions, all functions which do not coincide with book attributes are saved in an identifiable format instead of the flag F. Icons corresponding to the saved functions are added to a corresponding chapter or page, and displayed at the tree portion 901. Which function is used for a chapter or page in the tree portion 901 can be determined at a glance. In this case, processing of displaying a plurality of icons must be added to step S2712.

As a method of displaying a unique function, other than the above flow chart, when the mouse cursor is moved to a chapter or page having a unique function, the unique function may be notified by a tool chip.

The present invention may be applied to a system constituted by a plurality of devices (e.g., a host computer, interface device, reader, and printer) or an apparatus (e.g., a copying machine or facsimile apparatus) formed from a single device.

The object of the present invention is also achieved when a storage medium (or recording medium) which stores software program codes for realizing the functions of the above-described embodiments is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the functions of the above-described embodiments are realized when an operating system (OS) running on the computer performs part or all of actual processing on the basis of the instructions of the program codes.

The functions of the above-described embodiments are also realized when the program codes read out from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

The present invention is not limited to the above embodiments and various changes and modifications can be made within the spirit and scope of the present invention. Therefore, to apprise the public of the scope of the present invention, the following claims are made.

What is claimed is:

1. A document processing method of setting a print format of document data which has a hierarchical structure comprising a plurality of chapters, comprising:

a first setting step of setting a print format of the entire document data as a first hierarchy in accordance with a designation input via a first print format setting screen;

a second setting step of setting a print format of each chapter included in the document data as a second hierarchy in accordance with a designation input via a second print format setting screen; and a generation step of generating the print format information of the document data on the basis of the print formats set in said first and second setting steps, wherein the print format of the chapter is classified into a plurality of print function groups, wherein said second setting step further includes:

a correspondence setting step of setting whether or not each print function group of the print format of the chapter corresponds to the print format of the entire document data; and an item setting step of setting each print function group of the print format of the chapter independently of the print format of the entire document data, in a case where said correspondence setting step sets that each print function group of the print format of the chapter does not correspond to the print format of the entire document data, and wherein in said print format generation step, each print function group of the print format of the chapter which does not correspond to the print format of the entire document data is generated by using the print format of the chapter set in said second setting step, and each print function group of the print format of the chapter which corresponds to the print format of the entire document data is generated by using the print format of the entire document data set in said first setting step.

2. The method according to claim 1, further comprising a third setting step of setting the print format of each page included in the chapter as a third hierarchy.

3. The method according to claim 2, wherein said third setting step includes:
   a page format setting step of setting whether the print format of a page corresponds to the print format of the chapter that is included in the page set in said second setting step; and
   a page item setting step of setting the print format of the page independent from the print format of the chapter that is included in the page, in a case where in said page format setting step, it is set that the print format of the page does not correspond to the print format of the chapter that is included in the page.

4. The method according to claim 3, wherein said print format generation step sets the print format of the page set in said page item setting step to a page to which the print format of the chapter does not correspond and generates the print format information of the page to which the print format of the chapter corresponds, using the print format of the chapter set in said second setting step.

5. A document processing apparatus for setting a print format of document data having a hierarchical structure comprising a plurality of chapters, comprising:
   first setting means for setting a print format of the entire document data as a first hierarchy in accordance with a designation input via a first print format setting screen;
   second setting means for setting a print format of each chapter included in the document data as a second hierarchy in accordance with a designation input via a second print format setting screen; and
   print format generation means for generating the print format information of the document data on the basis of settings by said first and second setting means,
   wherein the print format of the chapter is classified into a plurality of print function groups,
   wherein said second setting means further includes:
      correspondence setting means for setting whether or not each print function group of the print format of the chapter corresponds to the print format of the entire document data; and
      item setting means for setting each print function group of the print format of the chapter independently of the print format of the entire document data, in a case where said correspondence setting means sets that each print function group of the print format of the chapter does not correspond to the print format of the entire document data, and
   wherein said print format generation means generates each print function group of the print format of the chapter which does not correspond to the print format of the entire document data by using the print format of the chapter set by said second setting means, and generates each print function group of the print format of the chapter which corresponds to the print format of the entire document data by using the print format of the entire document data set by said first setting means.

6. The apparatus according to claim 5, further comprising third setting means for setting the print format of each page included in the chapter as a third hierarchy.

7. The apparatus according to claim 6, wherein said third setting means includes:
   page format setting means for setting whether the print format of a page corresponds to the print format of the chapter set by said second setting means, that is included in the page, and
   page item setting means for setting the print format of the page independent from the print format of the chapter that is included in the page, in a case where said page format setting means sets that the print format of the page does not correspond to the print format of the chapter that is included in the page.

8. The apparatus according to claim 7, wherein said print format generation means sets the print format of the page set by said page item setting means to a page to which the print format of the chapter does not correspond and generates the print format information of the page to which the print format of the chapter corresponds, using the print format of the chapter set by said second setting means.

9. A computer-readable storage medium comprising a computer-executable program for realizing the document processing method defined in claim 1.

* * * * *